United States Patent
Schulz-Andres et al.

[11] Patent Number: 5,957,258
[45] Date of Patent: Sep. 28, 1999

[54] FRICTION CLUTCH FOR A MOTOR VEHICLE

[75] Inventors: Heiko Schulz-Andres, Poppenhausen; Hans Jürgen Drexl, Schonugen, both of Germany

[73] Assignee: Mannesmann Sachs AG, Schweinfurt, Germany

[21] Appl. No.: 08/980,215

[22] Filed: Nov. 28, 1997

Related U.S. Application Data

[63] Continuation of application No. 08/500,197, Jul. 10, 1995.

[30] Foreign Application Priority Data

Jul. 12, 1994 [DE] Germany .............................. 44 24 478
Apr. 8, 1995 [DE] Germany ........................... 195 13 454

[51] Int. Cl.⁶ ..................................................... F16D 13/68
[52] U.S. Cl. .................................. 192/70.17; 192/107 C; 192/109 A; 192/112
[58] Field of Search .............................. 192/70.17, 107 C, 192/112, 70.14, 109 A, 109 B, 89.23, 212

[56] References Cited

U.S. PATENT DOCUMENTS

| | | |
|---|---|---|
| 4,241,820 | 12/1980 | Ban et al. . |
| 4,593,803 | 6/1986 | Valier . |
| 4,615,424 | 10/1986 | Kohler . |
| 4,632,235 | 12/1986 | Flotow et al. ...................... 192/70.27 |
| 4,967,892 | 11/1990 | Tomija et al. . |
| 5,014,838 | 5/1991 | Suzuki .......................... 192/70.27 X |
| 5,048,659 | 9/1991 | Tojima . |
| 5,085,307 | 2/1992 | Scheer ............................... 192/107 C |
| 5,184,704 | 2/1993 | Hays .................................... 192/70.14 |
| 5,431,269 | 7/1995 | Ament et al. . |

FOREIGN PATENT DOCUMENTS

| | | |
|---|---|---|
| 0162393 | 11/1985 | European Pat. Off. . |
| 0554472 | 8/1993 | European Pat. Off. . |
| 1318525 | 1/1963 | France . |
| 2556061 | 6/1985 | France . |
| 2669088 | 5/1992 | France . |
| 0011284 | 8/1956 | Germany . |
| 254692 | 3/1977 | Germany . |
| 3224404 | 1/1984 | Germany . |
| 3448027 | 6/1985 | Germany . |
| 3802955 | 9/1988 | Germany . |
| 3990870 | 7/1990 | Germany . |
| 4239289 | 5/1993 | Germany . |
| 1003406 | 9/1965 | United Kingdom . |
| 2093933 | 9/1982 | United Kingdom . |
| 2109067 | 5/1983 | United Kingdom . |
| 2123499 | 2/1984 | United Kingdom . |
| 2186331 | 8/1987 | United Kingdom . |
| 2237077 | 4/1991 | United Kingdom . |
| 2243884 | 11/1991 | United Kingdom . |
| 2244313 | 11/1991 | United Kingdom . |
| 2263509 | 7/1993 | United Kingdom . |

OTHER PUBLICATIONS

G. Niemann, H. Winter, "Maschinen–elemente", 1983, p. 230.

Primary Examiner—Rodney H. Bonck
Assistant Examiner—Saúl J. Rodriquez

[57] ABSTRACT

A friction clutch with a flywheel and a clutch housing has the flywheel and clutch housing connected to one another by means of a preferably cylindrical wall located in the radially outer portion of the clutch housing. The cylindrical wall can extend in a ring-shaped manner around the axis of rotation of the flywheel. The clutch housing encloses a clutch plate with friction linings in the radially outer area, and an application plate or pressure plate can be pressed toward the clutch plate by means of an application spring. The friction linings can be guided or extended radially outwardly up to directly next to the cylindrical wall, to make possible, with a specified friction surface, a minimum ratio of outside diameter to inside diameter on the friction linings. The friction linings can be connected to the clutch disc without the interposition of a lining spring system.

20 Claims, 9 Drawing Sheets

FRICTION CLUTCH FOR A MOTOR VEHICLE

CROSS-REFERENCE TO RELATED APPLICATIONS

This application is a continuing application of U.S. patent application Ser. No. 08/500,197, which was filed on Jul. 10, 1995, and which claims priority from Federal Republic of Germany Patent Application Nos. 195 13 454.0 filed on Apr. 8, 1995 and 44 24 478.9 filed on Jul. 12, 1994.

BACKGROUND OF THE INVENTION

1. Field of the Invention

The present invention generally relates to a friction clutch for a motor vehicle, the friction clutch having a flywheel and a clutch housing. The flywheel and the clutch housing are connected to one another by means of a cylindrical wall disposed near the radially outer portion of the clutch housing. The cylindrical wall can extend in a ring-shaped manner about the axis of rotation of the flywheel. The friction clutch can also generally include a clutch plate having friction linings in its radially outer area, and an application plate or pressure plate which can be pressed towards the clutch plate by means of an application spring.

2. Background Information

German Patent No. 38 02 955 A1 discloses a motor vehicle friction clutch with a clutch housing, which clutch housing extends toward the flywheel in the form of a cylindrical wall formed in the circumferential area of the clutch housing. With the free end of this wall, the clutch housing encloses the flywheel, and is connected to the flywheel by means of screws. By means of its cylindrical wall, the clutch housing encloses a clutch plate, which clutch plate is located between the flywheel and an application plate or pressure plate. The clutch plate is designed in the radially outer area to support friction linings. Pressure can be applied to the above mentioned application plate toward the clutch plate by means of an application spring, which application spring is mounted on the clutch housing.

A friction clutch with a clutch housing designed in this manner takes up little space in the radial direction. However, there are essentially no measures in a friction clutch of this type which would make possible an engagement or disengagement of the clutch by means of only a relatively low expenditure of force.

German Patent No. 42 39 289 A1 also discloses a motor vehicle friction clutch with a clutch plate. In the circumferential area of the clutch plate, there is a friction lining on each of the two sides of a lining spring system. One of these friction linings is adjacent to a flywheel, while the other friction lining faces an application plate. The application plate can be pressed towards the clutch plate by means of an application spring, which application spring is mounted on the clutch housing. The application spring, the application force of which is kept constant by means of an adjustment device which acts in the event of wear, is active during engagement or disengagement in the opposite direction to the lining spring system. As such, during the engagement or disengagement process, the two spring forces can at least partly offset one another. Consequently, but at the cost of a rather expensive design and construction, the clutch can be engaged or disengaged with a relatively small expenditure of force.

On this friction clutch, the clutch housing has a wider portion in the manner of a flange in the area in which it is connected to the flywheel, and thus takes up a comparatively large amount of radial space, with respect to the outside diameter of the clutch plate.

German Patent No. 25 42 692 C2 discloses that, on the clutch plate of a friction clutch, it is possible to rivet a backing or base on a support part, and to glue the friction linings to the backing. Since the friction linings are generally located in the circumferential area of the clutch plate, a disadvantage can be that the mass moment of inertia of the clutch plate can be relatively high due to the backing.

OBJECT OF THE INVENTION

The object of the present invention is to design a friction clutch so that, while maintaining a low construction or manufacturing expense, and while maintaining compact radial dimensions, the forces required to engage or disengage the clutch can be kept low, as well as the mass moment of inertia of the clutch plate.

SUMMARY OF THE INVENTION

The present invention teaches that this object can be accomplished by locating the friction linings of the clutch plate radially outwardly, essentially almost directly adjacent the cylindrical wall. As such, with a specified or predetermined friction surface area, a minimum ratio of outside diameter to inside diameter of the friction linings can be made possible. Further, the friction linings can be connected to the clutch disc, in accordance with one embodiment, without the interposition of a lining spring system.

By means of an appropriate configuration of the cylindrical wall, e.g. in the circumferential area of the clutch housing or of the flywheel, with a specified outside diameter of the clutch housing, radial space can be saved inside the cylindrical wall. Thus, it can be possible to enlarge the clutch plate and thus to enlarge the outside diameter of the friction lining, if, as taught by the present invention, the clutch plate is guided radially outwardly until almost up to the cylindrical wall. With a given friction surface, due to the enlargement of the friction lining, the inside diameter of the lining can be increased by a relatively large amount, so that the ratio of the outside diameter to the inside diameter decreases, and in absolute terms, assumes a minimum for a clutch housing of this circumference. In accordance with a preferred embodiment, this ratio can be less than the factor 1.4.

As a result of the enlargement of the diameter of the friction lining, the mathematically calculated average friction radius preferably increases. Consequently, the application force which can be applied by the application spring can be reduced, which also means that the force required to engage and disengage the clutch can be reduced. In other words, and in accordance with one embodiment of the present invention, if the inside and outside diameter of the friction linings is increased, while maintaining the ratio of inside to outside diameter at about 1.4 or less, the friction surface of the friction linings can be made larger, which can preferably lessen the force needed to engage and disengage the clutch.

In principle, an enlargement of the outside diameter of the clutch plate and thus a location of the friction lining at a greater distance from the axis of rotation of the friction clutch can result in an increase in the mass moment of inertia of the clutch plate. This mass moment of inertia can preferably be counteracted by eliminating a lining spring system and connecting the friction linings to the clutch plate, for example, by means of carrier plates. In accordance with one embodiment, it can also be possible to fasten the friction linings to the clutch plate by means of glue. The glued connection can preferably be made by spraying the friction lining onto the corresponding carrier plate of the clutch plate. In contrast, if a lining spring system were used, due to the elasticity of the system in the axial direction, the friction linings would essentially have to be attached to the clutch plate by rivets, or, if the friction linings were instead glued onto the clutch plate, the friction linings would typically have to be glued onto a backing which backing would, in turn, have to be riveted to the clutch plate. By eliminating the rivets and/or the additional backing, it can become possible to eliminate some of the weight of the clutch plate located at some distance from the axis of rotation.

Due to the elimination of a lining spring system, the distance which must typically be travelled by the application plate in the axial direction, for the engagement or disengagement of the clutch, can be reduced by the distance corresponding to the deformation of the lining spring system. Providing the travel on an apparatus for the engagement or disengagement remains constant, the translation of the application spring can be increased on account of this reduction of the distance to the application plate. Thus the force required for engagement or disengagement of the clutch can be decreased with a relatively low construction or manufacturing expense.

Essentially the same benefit relating to the application spring can be obtained if a lining spring system is used instead of a lining support. In accordance with this embodiment of the present invention, the deformation distance of the lining spring system can preferably be only a fraction of the deformation distance of conventional lining spring systems. On one hand, the application plate can thereby travel a distance which is hardly greater than in the embodiment without the lining spring system, so that the application spring can act with a translation which almost corresponds to that without the lining spring system. On the other hand, the very small deformation distance of the lining spring system, in accordance with the present invention., can typically be sufficient to compensate for thermally caused deformations, for example, of the application plate, but also on the counterpressure plate (for example in the form of a flywheel). Thus, full surface contact between the clutch elements contacting the friction linings and the friction linings can essentially be guaranteed, at essentially all times. One preferred deformation distance of such a lining spring system in the axial direction can preferably be between about 0.1 and 0.3 mm.

By eliminating a lining spring system, or by using a lining spring system with a relatively small deformation distance, some, or possibly all, of the elasticity in the friction clutch can be lost. However, this elasticity can preferably be introduced at another point. In accordance with one embodiment of the present invention, the clutch housing can preferably be designed so that it can be deformed elastically in the excursion direction of the application plate, i.e. the axial direction. The elasticity of the clutch housing can preferably be achieved either by providing the housing with a thinner wall, or by a providing the housing with a special geometric shape.

In accordance with one embodiment, on a clutch housing in accordance with the present invention, the clutch housing can be connected to the application plate by means of a spring element, preferably in the form of a leaf spring. The spring element can preferably be held to the application plate by means of a fastening means located in an opening formed in the application plate. In addition, the application spring can preferably be fastened radially near the inner diameter of the friction lining to the clutch housing and can apply pressure to the application plate.

As discussed above, due to the contact between the friction lining and the clutch plate, preferably without the interposition of a spring lining system, the force to be applied by the application spring can be comparatively low. Thus, it can be possible to use a weaker application spring which can be designed in a ring-shape with a relatively small radial diameter. The application spring can be held to the clutch housing by fastening means located radially inward of the friction lining. The installation of a relatively weak application spring having a relatively small circumferential dimension can also save material.

Such material savings, as well as material savings on the flywheel or other clutch components such as the application spring, which are possible in particular when a modular clutch is used, can be used to maintain a specified weight of the friction clutch, while the application plate can be made correspondingly heavier. The danger of the failure of the application plate in the event of warping or distortion can thereby preferably be reduced.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

One aspect of the invention resides broadly in a friction clutch, such as for a motor vehicle, the friction clutch comprising: a flywheel, the flywheel having an axis of rotation and defining an axial direction parallel to the axis of rotation; a housing; a clutch plate disposed within the housing, the clutch plate having an outer circumference disposed about the axis of rotation and an inner circumference disposed within the outer circumference; a pressure plate disposed within the housing for engaging and disengaging the clutch plate with the flywheel; the clutch plate being disposed between the flywheel and the pressure plate; apparatus for biasing the pressure plate towards the flywheel; the clutch plate comprising: a hub for being non-rotationally connected to a transmission shaft, the hub being disposed at the inner circumference of the clutch plate; at least one friction lining being disposed for contacting the flywheel and being disposed for contacting the pressure plate upon engagement of the clutch plate, the at least one friction lining having an inner diameter and an outer diameter; the at least one friction lining having a predetermined surface area defined between the inner diameter and the outer diameter of the at least one friction lining; the at least one friction lining being disposed at the outer circumference of the clutch plate; apparatus for enclosing at least the clutch plate, the enclosing apparatus comprising wall apparatus; the wall apparatus having an interior portion facing towards the clutch plate and an exterior portion opposite the interior portion, the interior portion of the wall apparatus having a diameter; the at least one friction lining being disposed to form a clearance between the interior portion of the wall apparatus and the outer diameter of the at least one friction lining, the clearance being minimized but permitting substantially unencumbered rotation of the clutch plate during operation of the friction clutch; and the outer diameter of the at least one friction lining being maximized with respect to the diameter of the interior portion of the wall apparatus, and the inner diameter of the at least one friction lining being maximized to maintain the predetermined surface area of the at least one friction lining.

Another aspect of the present invention resides broadly in a method of making and operating a friction clutch for a motor vehicle, the friction clutch comprising: a flywheel, the flywheel having an axis of rotation and defining an axial direction parallel to the axis of rotation; a housing; a clutch plate disposed within the housing, the clutch plate having an outer circumference disposed about the axis of rotation and an inner circumference disposed within the outer circumference; a pressure plate disposed within the housing for engaging and disengaging the clutch plate with the flywheel; the clutch plate being disposed between the flywheel and the pressure plate; apparatus for biasing the pressure plate towards the flywheel; the clutch plate comprising: a hub for being non-rotationally connected to a transmission shaft, the hub being disposed at the inner circumference of the clutch plate; at least one friction lining being disposed for contacting the flywheel and being disposed for contacting the pressure plate upon engagement of the clutch plate, the at least one friction lining having an inner diameter and an outer diameter; the at least one friction lining having a predetermined surface area defined between the inner diameter and the outer diameter of the at least one friction lining; the at least one friction lining being disposed at the outer circumference of the clutch plate; apparatus for enclosing at least the clutch plate, the enclosing apparatus comprising wall apparatus; the wall apparatus having an interior portion facing towards the clutch plate and an exterior portion opposite the interior portion, the interior portion of the wall apparatus having a diameter; the at least one friction lining being disposed to form a clearance between the interior portion of the wall apparatus and the outer diameter of the at least one friction lining, the clearance being minimized but permitting substantially unencumbered rotation of the clutch plate during operation of the friction clutch; and the outer diameter of the at least one friction lining being maximized with respect to the diameter of the interior portion of the wall apparatus, and the inner diameter of the at least one friction lining being maximized to maintain the predetermined surface area of the at least one friction lining, the method comprising the steps of: providing a flywheel, the flywheel having an axis of rotation and defining an axial direction parallel to the axis of rotation; providing a housing; providing a clutch plate, the clutch plate having an outer circumference disposed about the axis of rotation and an inner circumference disposed within the outer circumference; providing a pressure plate for engaging and disengaging the clutch plate with the flywheel; providing apparatus for biasing the pressure plate towards the flywheel; the step of providing the clutch plate further comprising: providing a hub for being non-rotationally connected to a transmission shaft; providing at least one friction lining for contacting the flywheel and for contacting the pressure plate upon engagement of the clutch plate, the at least one friction lining having an inner diameter and an outer diameter; providing the at least one friction lining with a predetermined surface area defined between the inner diameter and the outer diameter of the at least one friction lining; providing apparatus for enclosing at least the clutch plate; the step of providing the enclosing apparatus further comprises providing wall apparatus; the step of providing the wall apparatus further comprises providing the wall apparatus with an interior portion facing towards the clutch plate and an exterior portion opposite the interior portion, the interior portion of the wall apparatus having a diameter; the method further comprising the steps of: disposing the at least one friction lining for contacting the flywheel and for contacting the pressure plate upon engagement of the clutch plate; further disposing the at least one friction lining at the outer circumference of the clutch plate; disposing the hub at the inner circumference of the clutch plate; non-rotationally connecting the hub to a transmission shaft; disposing the clutch plate within the housing; disposing the pressure plate within the housing; further disposing the clutch plate between the flywheel and the pressure plate; enclosing at least the clutch plate with the enclosing apparatus; biasing the pressure plate towards the flywheel, with the biasing apparatus; engaging the clutch plate with the flywheel, by apparatus of the pressure plate, to make contact between the at least one friction lining, the flywheel and the pressure plate; disengaging the clutch plate with the flywheel, by releasing the pressure plate, and discontinuing contact between the at least one friction lining, the flywheel and the pressure plate; further disposing the at least one friction lining to form a clearance between the interior portion of the wall apparatus and the outer diameter of the at least one friction lining; minimizing the clearance while permitting substantially unencumbered rotation of the clutch plate during operation of the friction clutch; and maximizing the outer diameter of the at least one friction lining with respect to the diameter of the interior portion of the wall apparatus, and maximizing the inner diameter of the at least one friction lining to maintain the predetermined surface area of the at least one friction lining.

Yet another aspect of the present invention resides broadly in a friction clutch, such as for a motor vehicle, the friction clutch comprising: a flywheel, the flywheel having an axis of rotation and defining an axial direction parallel to the axis of rotation; a housing; a clutch plate disposed within the housing, the clutch plate having an outer circumference disposed about the axis of rotation and an inner circumference disposed within the outer circumference; a pressure plate disposed within the housing for engaging and disengaging the clutch plate with the flywheel; first apparatus for biasing the pressure plate towards the flywheel; the clutch plate being disposed between the flywheel and the pressure plate; the clutch plate comprising: a hub for being non-rotationally connected to a transmission shaft, the hub being disposed at the inner circumference of the clutch plate; a first friction lining and a second friction lining for contacting the flywheel and the pressure plate upon engagement of the clutch plate; the first friction lining and the second friction lining being disposed at the outer circumference of the clutch plate; second apparatus for biasing the first friction lining and the second friction lining away from one another; and the second biasing apparatus having apparatus for permitting axial movement of the first friction lining and the second friction lining towards one another upon engagement of the first friction lining and the second friction lining between the flywheel and the pressure plate, the axial movement being of a minimum dimension sufficient to compensate for thermal distortions, at maximum operating temperatures, of at least one of: the flywheel and the pressure plate.

Still another aspect of the present invention resides broadly in a method of making and operating a friction clutch for a motor vehicle, the friction clutch comprising: a flywheel, the flywheel having an axis of rotation and defining an axial direction parallel to the axis of rotation; a housing; a clutch plate disposed within the housing, the clutch plate having an outer circumference disposed about the axis of rotation and an inner circumference disposed within the outer circumference; a pressure plate disposed within the housing for engaging and disengaging the clutch plate with the flywheel; the clutch plate being disposed between the flywheel and the pressure plate; the clutch plate comprising: a hub for being non-rotationally connected to a transmission shaft, the hub being disposed at the inner circumference of the clutch plate; a first friction lining and a second friction lining for contacting the flywheel and the pressure plate upon engagement of the clutch plate; the first friction lining and the second friction lining being disposed at the outer circumference of the clutch plate; apparatus for biasing the first friction lining and the second friction lining away from one another; and the biasing apparatus having apparatus for permitting axial movement of the first friction lining and the second friction lining towards one another upon engagement of the first friction lining and the second friction lining between the flywheel and the pressure plate, the axial movement being of a minimum dimension sufficient to compensate for thermal distortions, at maximum operating temperatures, of at least one of: the flywheel and the pressure plate, the method comprising the steps of: providing a flywheel, the flywheel having an axis of rotation and defining an axial direction parallel to the axis of rotation; providing a housing; providing a clutch plate, the clutch plate having an outer circumference disposed about the axis of rotation and an inner circumference disposed within the outer circumference; providing a pressure plate for engaging and disengaging the clutch plate with the flywheel; providing first apparatus for biasing the pressure plate towards the flywheel; the step of providing the clutch plate further comprising: providing a hub for being non-rotationally connected to a transmission shaft; providing a first friction lining and a second friction lining for contacting the flywheel and the pressure plate upon engagement of the clutch plate; providing second apparatus for biasing the first friction lining and the second friction lining away from one another; and the step of providing the second biasing apparatus further comprises providing apparatus for permitting axial movement of the first friction lining and the second friction lining towards one another upon engagement of the first friction lining and the second friction lining between the flywheel and the pressure plate; the method further comprising the steps of: disposing the hub at the inner circumference of the clutch plate; non-rotationally connecting the hub to a transmission shaft; disposing the first friction lining and the second friction lining at the outer circumference of the clutch plate; disposing the clutch plate within the housing; disposing the pressure plate within the housing; further disposing the clutch plate between the flywheel and the pressure plate; biasing the pressure plate towards the flywheel, with the first biasing apparatus; biasing the first friction lining and the second friction lining away from one another, with the second biasing apparatus; engaging the clutch plate with the flywheel, with the pressure plate, and contacting the first friction lining with the flywheel and the second friction lining with the pressure plate; and permitting minimal axial movement, with the apparatus for permitting axial movement, of the first friction lining and the second friction lining towards one another upon engagement of the first friction lining and the second friction lining between the flywheel and the pressure plate, to compensate for thermal distortions, at maximum operating temperatures, of at least one of: the flywheel and the pressure plate.

BRIEF DESCRIPTION OF THE DRAWINGS

Several embodiments of the present invention are explained in greater detail below and are illustrated in the accompanying drawings, in which:

FIG. 2 shows a detail of the flywheel, clutch plate and clutch housing with a different design in the circumferential area from the embodiment illustrated in FIGS. 1 and 1a;

DESCRIPTION OF THE PREFERRED EMBODIMENT

Figure 1:
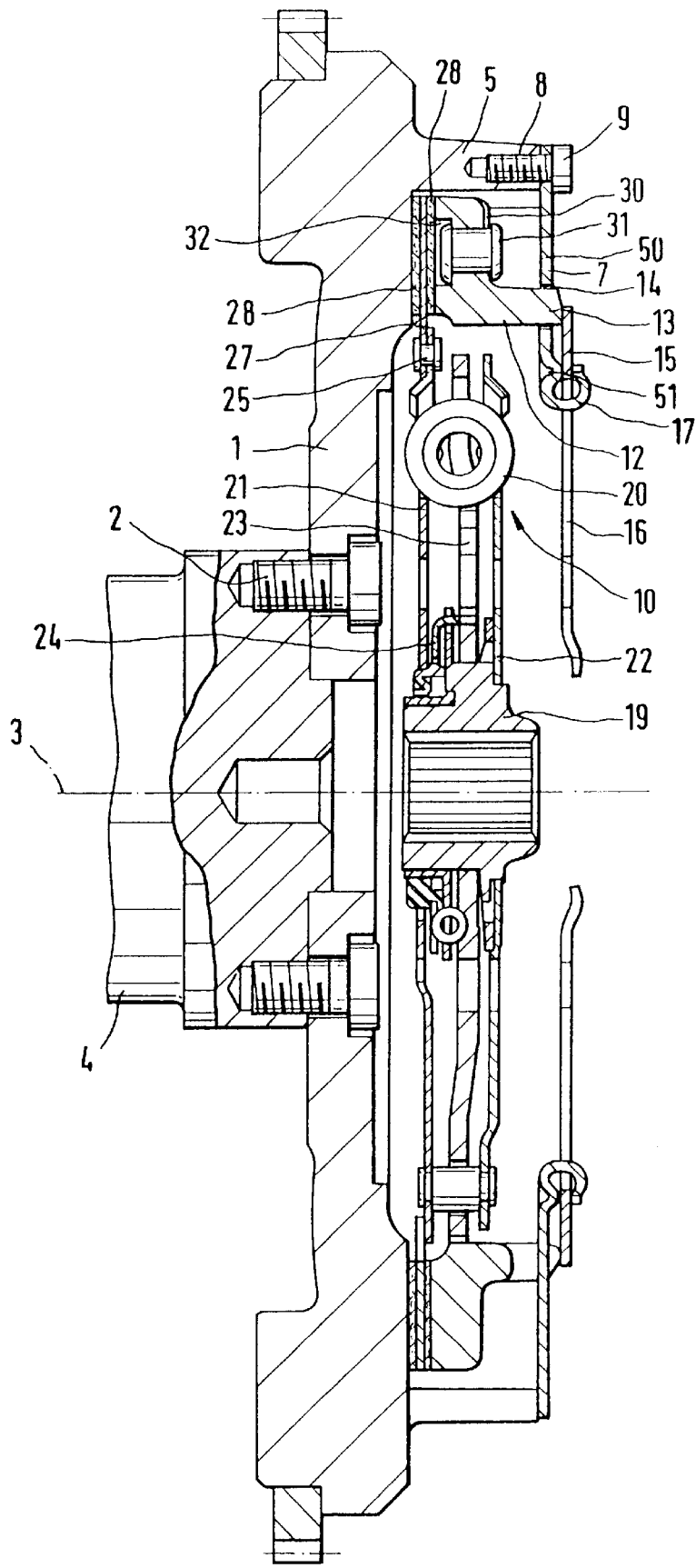
FIG. 1 shows a friction clutch with a flywheel, a clutch plate and a clutch housing, in longitudinal section.
Figure 1A:
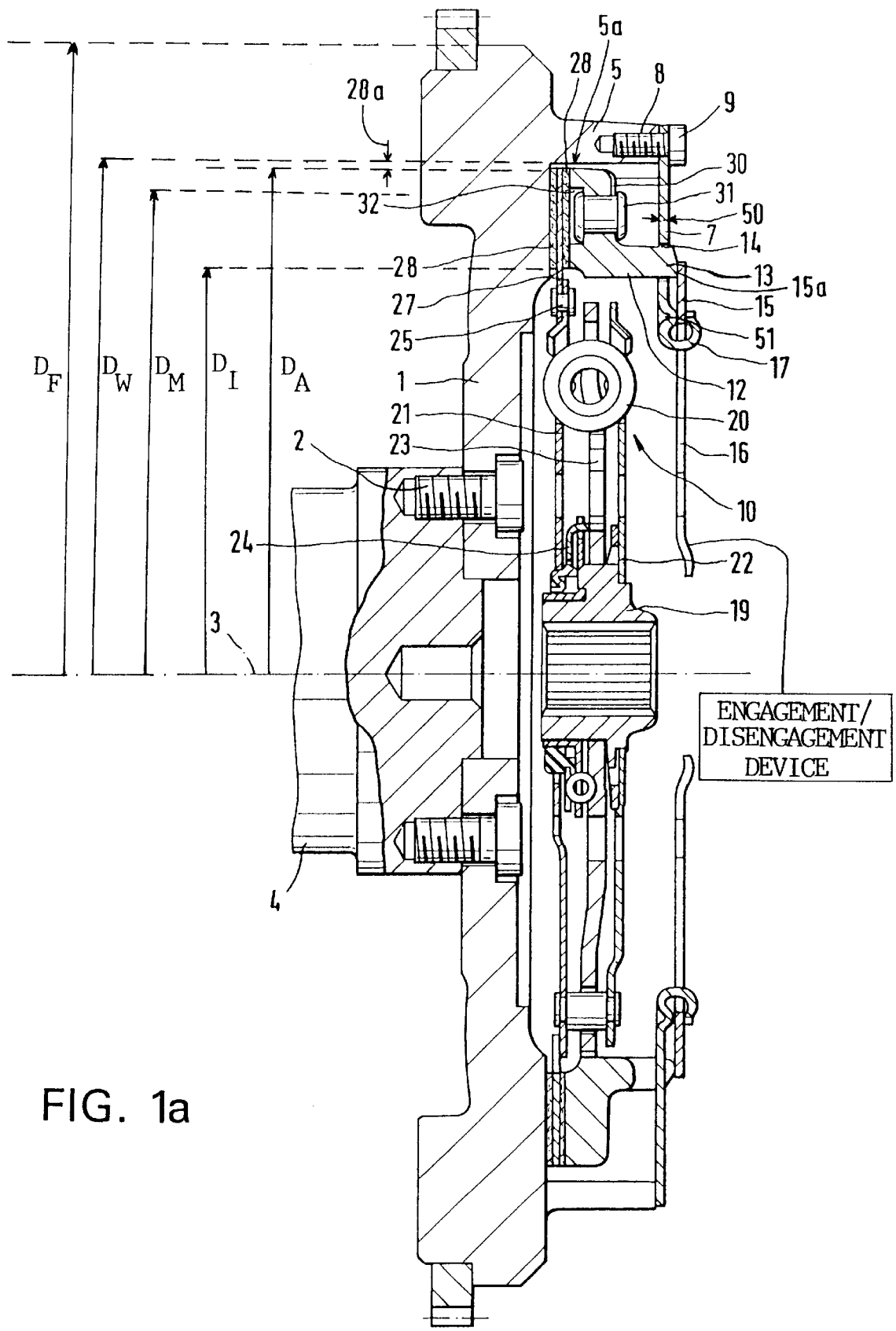
FIG. 1a shows substantially the same view as FIG. 1, but shows additional details.

The motor vehicle friction clutch illustrated in FIGS. 1 and 1a can preferably include a flywheel 1, which flywheel 1 can be fastened, for example by bolts 2, equiaxially to a crankshaft 4. The flywheel 1 can rotate around an axis of rotation 3, as part of an internal combustion engine (not shown). The flywheel 1, in its radially outer area, can have a substantially cylindrical wall 5, which wall 5 extends towards a clutch housing 7. On the end of the wall 5 adjacent the clutch housing 7, there can preferably be threaded holes 8. Screws 9 for connecting the clutch housing 7 to the flywheel 1 can be inserted into these threaded holes 8. Of course, other methods of fastening the clutch housing 7 to the flywheel 1 would be within the scope of the present invention.

The cylindrical wall 5 of the flywheel 1 can surround a clutch plate 10 and a ring-shaped application plate or pressure plate 12. On the side of application plate 12 which faces away from the clutch plate 10, there can be an extension 13 which extends axially through a corresponding notch or hole 14 in the clutch housing 7. The extension 13 can preferably be pushed or biased by a free end 15a (see FIG. 1a) of an application spring 15. The application spring 15 can have a number of spring tabs 16 extending radially inwardly. The spring tabs 16 can be actuated in a known manner by a device (shown schematically in FIG. 1a) for engagement and disengagement of the clutch. The application spring 15 can preferably be held or positioned in its radially outer area on clips 17 of the clutch housing 7.

The clutch plate 10 can be displaced axially in a conventional manner by means of a hub 19, and can be non-rotationally coupled with an input shaft (not shown here, but see 4" in FIG. 8) of a transmission. Further, the clutch plate 10 can have two cover plates 21 and 22, which cover plates 21, 22 can preferably be located opposite one another on the hub 19. Between the two cover plates 21, 22 there can be a hub disc 23. Torsion springs 20 can be braced both on cover plates 21 and 22 and also on hub disc 23. There can also be torsional vibration dampers 24 located adjacent the hub 19, which vibration dampers 24 are generally well known and will therefore not be discussed further here.

A lining support 27 can be fastened in the radially outer area of cover plate 21, facing the flywheel, preferably by means of a riveted connection 25. The lining support 27 can have a friction lining 28 disposed on each side thereof in the circumferential area of the support 27. The friction linings 28, in accordance with this particular embodiment, can either be glued or sprayed directly onto the lining support 27, preferably without the utilization of a lining spring system. In accordance with one embodiment, the lining support 27 can preferably be considered to be a carrier plate or plates. The lining support 27, and thus the outside diameter of the friction linings 28, can extend in the radial direction to essentially directly next to an interior portion 5a (see FIG. 1a) of the cylindrical wall 5 of the flywheel 1. As a result, a friction lining, such as friction linings 28, can be given a very large outside diameter, and the inside diameter, for a specified friction surface, can also be relatively large, due to the relatively small extent of the friction lining 28 in the radial direction. Consequently, the ratio of the outside diameter to the inside diameter of the friction linings can be less than about 1.4, and can approach the limit value of 1.

In other words, and in accordance with one embodiment of the present invention, by extending the clutch plate 10, lining support 27, and the friction linings 28 further radially outwardly towards the cylindrical wall 5, the friction linings 28, while maintaining the necessary minimum outside to inside diameter, can be made larger and can thus provide a larger usable friction surface. Thus, space which was previously unused between the interior portion 5a (see FIG. 1a) of the wall 5 and the outer diameter of the friction linings 28 can preferably now be utilized to make the friction linings 28 larger, while the other components of the friction clutch can essentially remain the same size.

In accordance with one embodiment of the present invention, the ratio of the outside diameter to the inside diameter of the friction linings 28 shown in FIGS. 1 and 1a can be approximately 1.25.

Due to the large outside diameter $D_A$ (see FIG. 1a) and inside diameter $D_I$ (see FIG. 1a) of the friction linings 28, an average friction diameter $D_M$, which average friction diameter $D_M$ can be calculated, or at least estimated, by means of the following formula:

$$D_M = \frac{2}{3} \frac{D_A^3 - D_I^3}{D_A^2 - D_I^2}$$

can assume a maximum value for the specified diameter of the clutch housing 7, which means that the application force to be applied by the application spring 15 can preferably be reduced. Therefore, a relatively weak application spring 15 can be used to apply pressure to the friction linings 28 by means of the application plate 12.

In other words, and in accordance with one embodiment of the present invention, by extending the friction linings 28 radially outwardly towards the wall 5, as discussed above, the friction linings 28 can be made larger, while still maintaining the necessary ratio between the outside and inside diameters, and thus the surface areas of the friction linings 28 can be made larger. Thus, the force required to engage or disengage the clutch can be reduced because the force applied by the application spring 15 will be spread over a larger surface area than was previously the case. For example, given an outside diameter of 17.2 cm and an inside diameter of 13.8 cm, the ratio of the outside diameter to the inside diameter is approximately 1.25, as mentioned above. The surface area of a friction lining having these dimensions could be calculated using the following formula:

area=$(\pi r^2(\text{outside diameter}))-(\pi r^2(\text{inside diameter}))$

Utilizing this equation, the surface area of a friction lining having the above-noted dimensions would be approximately 82.8 cm$^2$. It should be apparent that if the diameter of the friction lining is reduced, the surface area of the friction lining will also be reduced. For example, if the friction lining has an outside diameter of 16.0 cm and an inside diameter of 12.8, which would provide a ratio of about 1.25, cm, the surface area would be approximately 72.4 cm$^2$.

In accordance with yet an additional possible embodiment of the present invention, by extending the clutch plate 10, the lining support 27 and the friction linings 28 further radially outwardly towards the wall 5, the application spring 15 could possibly be lengthened in the radial direction. As such, by lengthening the application spring 15, which spring 15 the engagement or disengagement force must act through, the work done by the force can be increased. Thus, the force required to engage or disengage the clutch can be lessened, at least to some extent.

The application plate 12 can preferably be connected to the clutch housing 7 by means of one or more spring elements 30, whereby the spring elements 30 can be connected to the clutch housing 7 by fastening means 31, for example rivets, which rivets 31 can be inserted into an opening 32 of the application plate 12. In accordance with one embodiment of the present invention, the spring elements 30 can preferably be in the form of leaf springs, wherein one end of each leaf spring can be fastened to the application plate 12 by means of the rivets 31, and the other end of the leaf springs can be attached to the clutch housing 7 by additional fastening means, such as by additional rivets not shown here.

The application spring 15, mounted radially inside the application plate 12 on the clutch housing 7 in the clips 17, can preferably act with its radially outer end 15a (see FIG. 1a) on the extension 13 of the application plate 12, and thus on the radially inner end of the application plate 12. In accordance with one possible embodiment of the present invention, by biasing the application plate 12 in its radially innermost portion wherein the extension 13 is preferably located, it may be possible to have an application spring 15 which is smaller in diameter.

As a result of the elimination of a lining spring system between the lining support 27 and the friction linings 28 of the clutch plate 10, on one hand, the mass moment of inertia of the clutch plate 10 can be reduced, and, on the other hand, the distance in the axial direction which must typically be travelled by the application plate 12 for engagement or disengagement of the clutch can be reduced by the distance which corresponds to the typical deformation distance of a lining spring system. Consequently, the application spring 15 which exerts pressure on the application plate 12 need execute only a relatively small axial movement, while the distance which must be travelled by a device for engagement or disengagement (see FIG. 1a) of the clutch can remain essentially unchanged. The engagement/disengagement device can typically interact with the tabs 16 of the application spring 15. Consequently, the translation ratio on the application spring 15 can be increased, and the force required for engagement or disengagement can preferably be significantly reduced. In connection with the reduction of this force on account of the maximization of the average friction diameter $D_M$, in the manner explained above, the result can be a friction clutch in which the force for engagement or disengagement is relatively small, with a correspondingly low manufacturing expense.

An additional result of the elimination of a lining spring system can be that the friction clutch can have reduced elasticity during engagement or disengagement. This reduction in elasticity can preferably be compensated for by a corresponding design of the clutch housing 7. In particular, the clutch housing 7 can be designed either with a lesser wall thickness 50 (as shown in FIGS. 1 and 1*a*), or by corresponding structural measures on the clutch housing 7. As shown in FIGS. 1 and 1*a*, the clutch housing 7 fastened radially outwardly on the wall 5 of the flywheel 1 can preferably act like a clamped leaf spring, such that its radially inner area 51 in the axial direction can have a particularly elastic behavior. Thus, the elasticity of the clutch housing 7 can be superimposed on the elasticity of the application spring 15.

Due to the heat which is generated when slip occurs between the application plate 12 and the corresponding friction lining 28, the application plate 12 can tend to warp, which tendency can be reduced, in accordance with one embodiment, by making the application plate 12 appropriately massive. Any extra weight in the friction clutch which thereby results can be compensated for by a more lightweight realization of the flywheel 1 and the additional clutch elements, such as the application spring 15, as discussed above, which can be done to particular advantage if the friction clutch is designed as a modular clutch.

In accordance with one embodiment of the present invention, the friction linings 28 can preferably be enlarged by extending the linings 28 essentially up to the interior portion 5*a* of the wall 5, while maintaining the desirable ratio of outside diameter to inside diameter (i.e. between 1.4 and 1). The linings 28 can preferably be extended towards the wall 5 to form a clearance 28*a* (see FIG. 1*a*), which clearance 28*a* can preferably be adequate to allow for rotation of the clutch plate 21 and linings 28 during operation of the friction clutch. In addition, this clearance 28*a* can preferably be of a dimension large enough to permit at least some thermal expansion of the clutch components, such as the clutch plate 21. In accordance with one embodiment of the present invention, the actual dimension of the clearance 28*a* can preferably be about 1.0 mm, with the flywheel 1 having a diameter $D_F$ (see FIG. 1*a*) of about 21.4 cm, the interior portion or surface 5*a* of wall 5 having a diameter $D_W$ of about 17.4 cm, and the outside diameter $D_A$ being about 17.2 cm, as discussed hereinabove. Of course, these dimensions may vary within the scope of the present invention, and, in accordance with additional embodiments the clearance 28*a* can be about 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, 1.0 cm, 1.5 cm, 2.0 cm, 2.5 cm, 3.0 cm, 3.5 cm or 4.0 cm. It should be understood that the present invention is not to be taken as limited to the values given above.

The actual dimensions of the outer and inner diameters of the friction linings 28 can preferably be chosen, in accordance with one embodiment, based on the properties (i.e. the coefficient of thermal expansion) of the materials from which the lining support 27 and the wall 5 are made. The lining support 27 will most likely heat up and expand faster than the wall 5 of the flywheel 1 (if the wall 5 is part of the flywheel 1) or of the housing 7 (if the wall 5 is part of the housing 7) due to the friction between the flywheel 1, the linings 28, and the pressure plate 12, and since the lining support 27 with its friction linings 28 is typically located in a substantially enclosed space. Thus, the clearance 28*a* should preferably be given a dimension which is adequate for permitting the lining support 27 to expand without coming into contact with the interior portion 5*a* of the wall 5, which contact could prevent normal operation or rotation of the clutch disc 21. However, the clearance 28*a* should be the minimum necessary so that the linings 28 can be made as large as possible while maintaining the desired ratio of the inner and outer diameters of the friction linings 28 (i.e. between about 1.4 and about 1.0). In addition, the coefficient of thermal expansion of the wall 5 may also be taken into consideration, as the wall 5 may itself expand due to the typically high operating temperatures of the friction clutch.

It should be understood that the above-cited dimensions can also apply to the embodiments discussed below with reference to FIGS. 2–9.

Figure 2A:
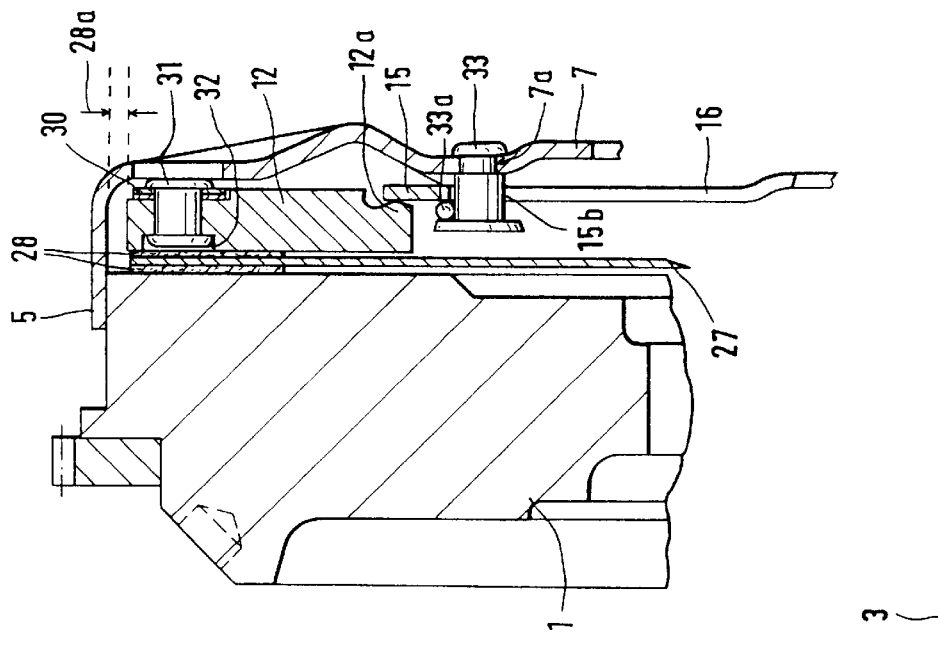
FIG. 2a shows substantially the same view as FIG. 2, but shows additional details.
Figure 2:
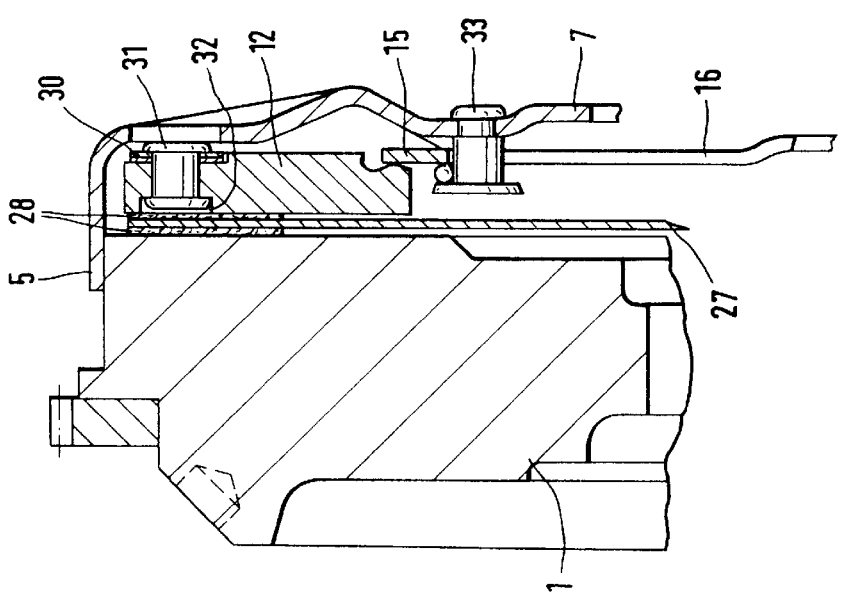

The friction clutch illustrated in FIGS. 2 and 2*a* differs from the clutch described above in terms of the configuration of the clutch housing 7. As shown in FIGS. 2 and 2*a*, the cylindrical wall 5 can preferably be part of the clutch housing 7. The clutch housing 7 can surround the flywheel 1 by means of the free end of the wall 5. Otherwise, as is shown in FIGS. 1 and 1*a*, there can be a lining support 27 between the clutch housing 7 and the flywheel 1, with friction linings 28 located in the radially outer area on both sides of the lining support 27, and an application plate 12 which is connected to the clutch housing 7 by means of fastening means 31. The fastening means 31 can each be located in an opening 32 of the application plate 12 and each fastening means 31 can preferably hold one end of a spring element 30. As discussed above with regard to FIGS. 1 and 1*a*, the spring elements 30 can preferably be designed in the form of leaf springs. As also discussed above, one end of the leaf springs can be fastened to the application plate by means of the fastening means 31, and the other ends of the leaf springs can be attached to the clutch housing 7 in a similar manner.

The clutch housing 7 can support an application spring 15, the spring 15 having a number of spring tabs 16, radially inside the ring-shaped application plate 12, which spring 15, by means of its radially outer end, can apply pressure to the radially inner end 12*a* (see FIG. 2*a*) of the application plate 12. In accordance with one embodiment of the present invention, the application plate 12 preferably does not have an extension 13 such as that shown in FIGS. 1 and 1*a*. Instead, the application plate 12 can have the curved radially inner end 12*a* (see FIG. 2*a*). In addition, the application spring 15 can be fastened to the clutch housing 7 by means of rivets 33, and can pivot about a ring 33a in order to engage or disengage the clutch. Further, there can preferably be holes 7*a* in the clutch housing for receiving the rivets 33. Likewise, there can also preferably be holes 15*b* in the application spring 15 for receiving the rivets 33 therethrough.

Figure 3:
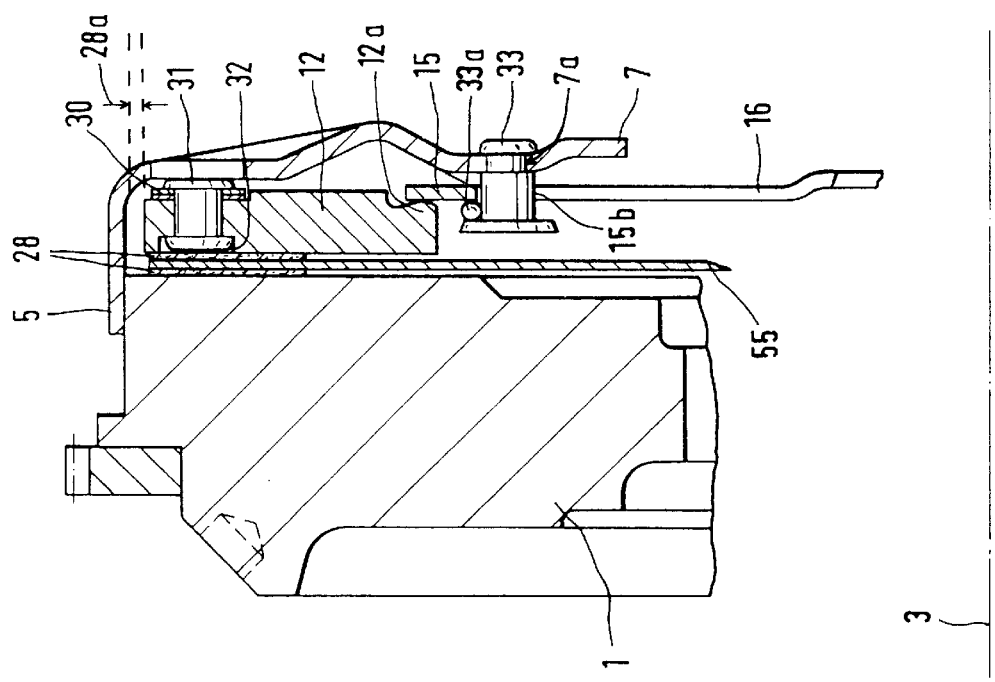
FIG. 3 is substantially the same as FIGS. 2 and 2a, but shows a lining spring system between the friction linings instead of a lining support.
Figure 3A:
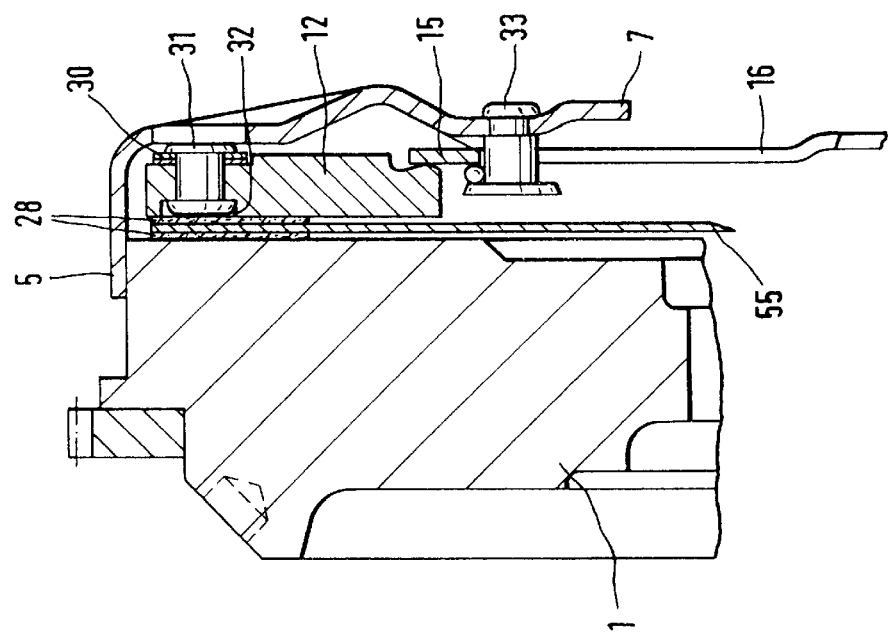
FIG. 3a shows substantially the same view as FIG. 3, but shows additional details.
Figure 4:
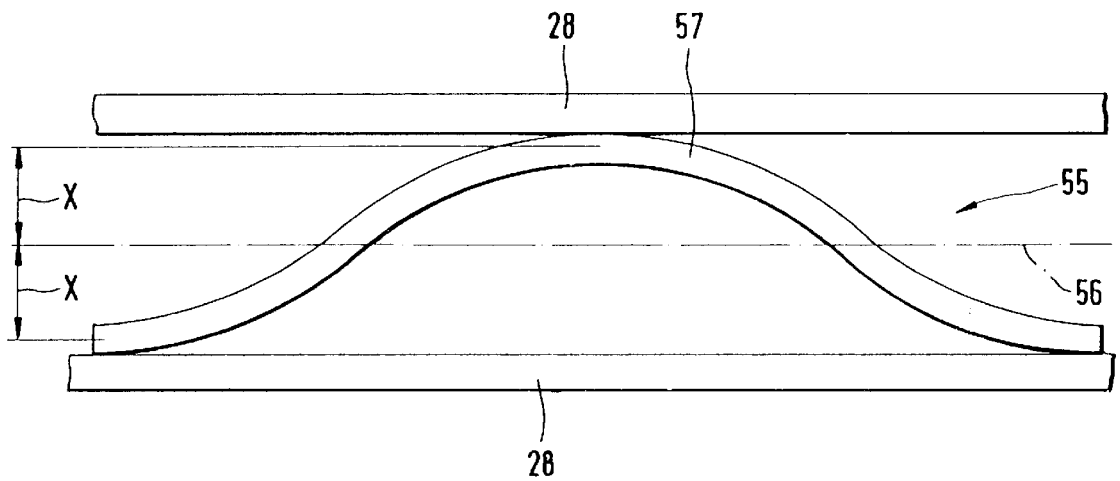
FIG. 4 shows a detail of a spring element of the lining suspension, viewed from radially outward on the clutch plate.
Figure 4A:
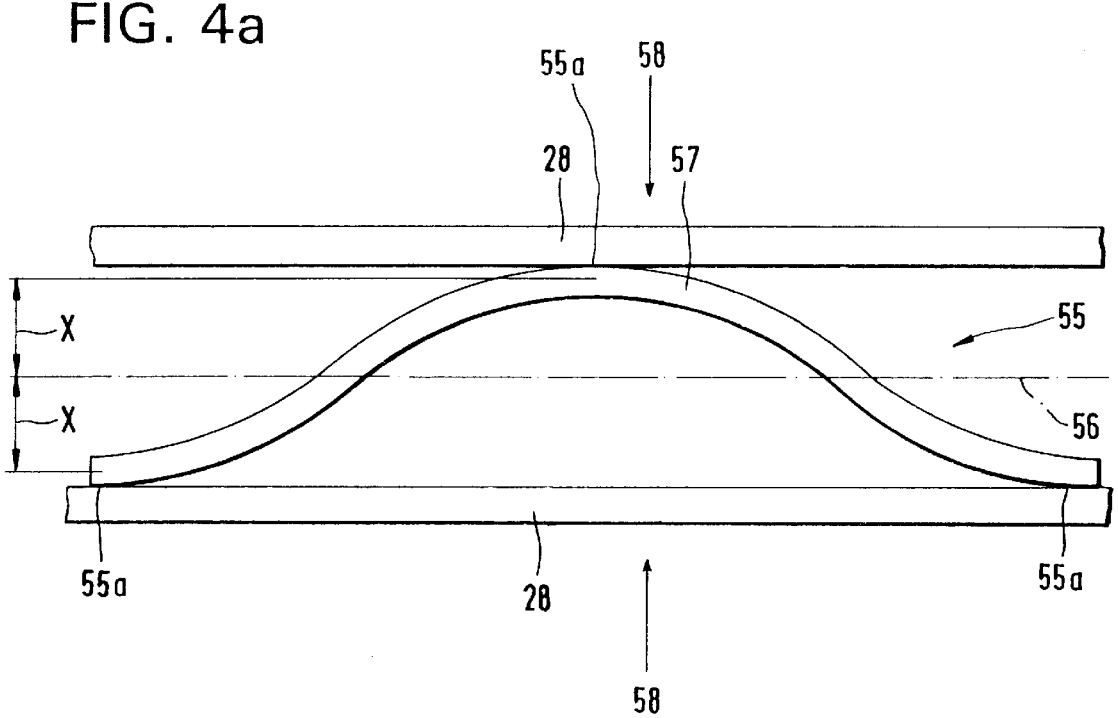
FIG. 4a shows substantially the same view as FIG. 4, but shows additional details.

FIGS. 3, 3*a*, 4 and 4*a* show a friction clutch similar to that shown in FIGS. 2 and 2*a*, however, the friction clutch shown in FIGS. 3–4*a* can preferably have a lining spring system 55 located between the friction linings 28. The lining spring system 55 can preferably include individual spring elements 57. The deformation distance of this lining spring system or suspension 55 can be kept sufficiently small by limiting the deformation x (see FIGS. 4 and 4a) in the axial direction with respect to the neutral axis 56 of the individual spring elements 57, one of which spring elements 57 is shown enlarged in FIGS. 4 and 4a. As such, there can be compensation for deformations caused by heat, in particular on the application plate 12, but also on the flywheel 1, which flywheel 1 can act as the counterpressure plate. The deformation distance x of the lining spring 55 can preferably be limited to about 0.1 to 0.3 mm, while in a lining suspension with a deformation distance specified in the conventional manner, the deformation distance is approximately 0.7 mm. Otherwise, the embodiments shown in FIGS. 3, 3a, 4 and 4a have essentially the same components as that shown in FIGS. 2 and 2a, and will not be discussed further here.

In accordance with one embodiment of the present invention, the lining spring system 55 shown in FIGS. 3, 3a, 4 and 4a can preferably be substituted for the lining support 27 shown in FIGS. 1–2a, and can preferably be attached to the clutch plate 21 (not shown in FIGS. 3, 3a, 4 and 4a) by means of rivets 25 (see FIGS. 1 and 1a), or other appropriate fastening means. Further, the individual spring elements 57 can preferably be formed as part of, or can be integral with the lining spring system 55 and can be formed on the outer circumference thereof. The individual spring elements 57 can preferably serve to bias the friction linings 28 in a direction away from one another. The linings 28, in accordance with one possible embodiment of the present invention, can be fastened to the lining spring system 55 by means of glue or adhesive applied to areas 55a (see FIG. 4a) of the individual spring elements 57, which areas 55a can preferably be in contact with a respective friction lining 28.

As shown in FIG. 4a, and in accordance with one embodiment of the present invention, when the friction clutch is fully engaged and there is a corresponding load on the linings 28 from the pressure plate 12 and the flywheel or counterpressure plate 1 as shown by the arrows 58, the lining spring system 55 can preferably have a spring travel x, which can be in the range of about 0.1 mm to 0.3 mm, as mentioned hereinabove. Thus, in accordance with one embodiment, when the clutch is fully engaged and the linings 28 are clamped between the flywheel 1 and the pressure plate 12, the lining spring system 55 can provide the linings 28 with a spring travel x in a direction towards one another. This spring travel x can preferably serve to compensate for any deformations of the flywheel 1 and/or the pressure plate 12. Thus, for example, if the pressure plate 12 develops a deformed area due to heat, possibly in the form of a raised area or bump, the lining spring system 55 can permit one or both of the friction linings 28 to move inwardly, i.e. towards the other lining or towards each other to thereby maintain a more even friction surface on the friction linings 28.

Figure 7:
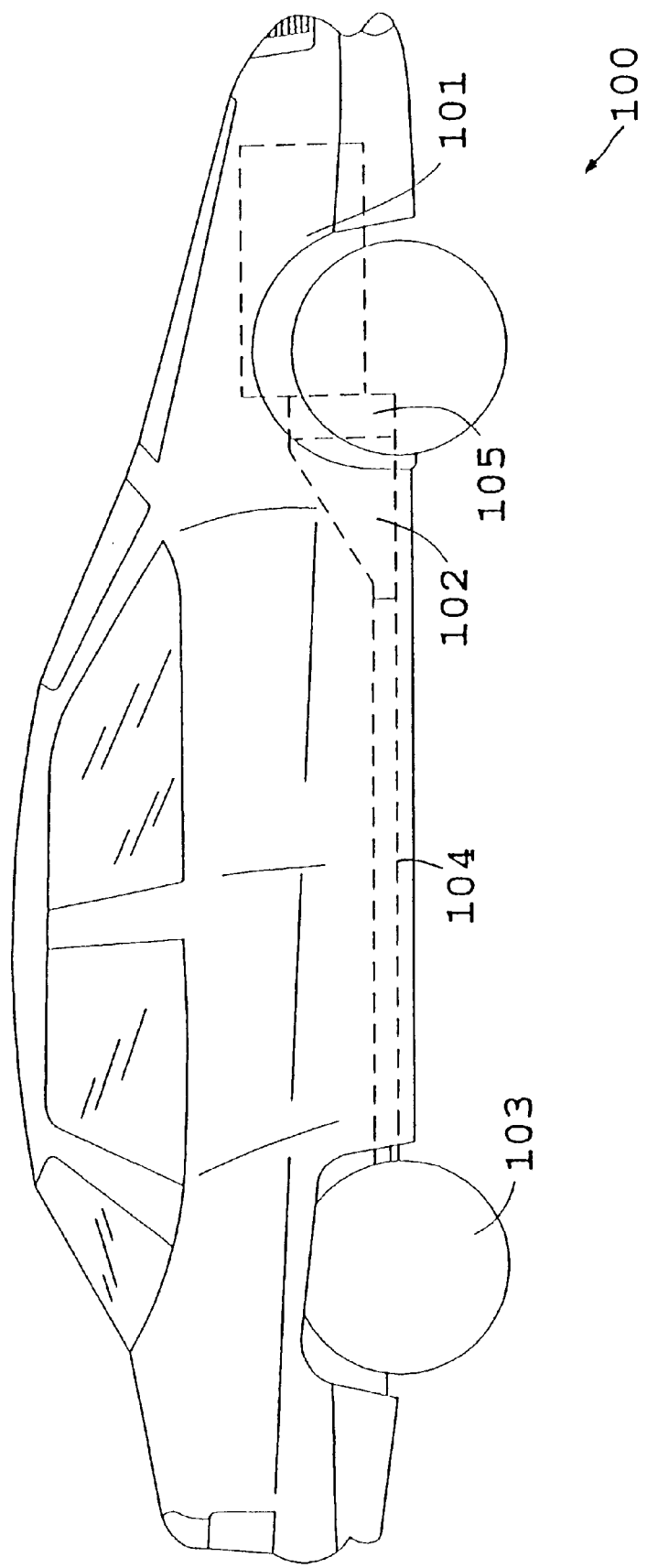
FIG. 7 shows a general depiction of a motor vehicle power train.

A depiction of a motor vehicle and corresponding power transmission components is shown in FIG. 7, wherein the motor vehicle 100 could typically have an internal combustion engine 101 mounted in a forward portion thereof. The motor vehicle 100 could also typically have a transmission 102 for transmission of mechanical power from the engine 101 to the rear vehicle wheels 103 via a drive shaft 104. A friction clutch 105 could preferably be provided, in accordance with the present invention, for engaging the transmission 102 with the engine 101. It should be understood that a friction clutch having a clutch plate 10, as shown in FIGS. 1 and 1a in accordance with the present invention, can preferably be utilized in the motor vehicle 100 shown in FIG. 7.

The disclosure now turns to additional embodiments of the present invention. It should be understood that the components discussed hereinbelow can be considered to be interchangeable with similar components discussed hereinabove. In the following discussion, it should also be understood, that use of the terminology "clutch plate" can be interchangeable with the terminology "clutch disc", and likewise that "friction linings" can be interchangeable with "friction rings".

Figure 8:
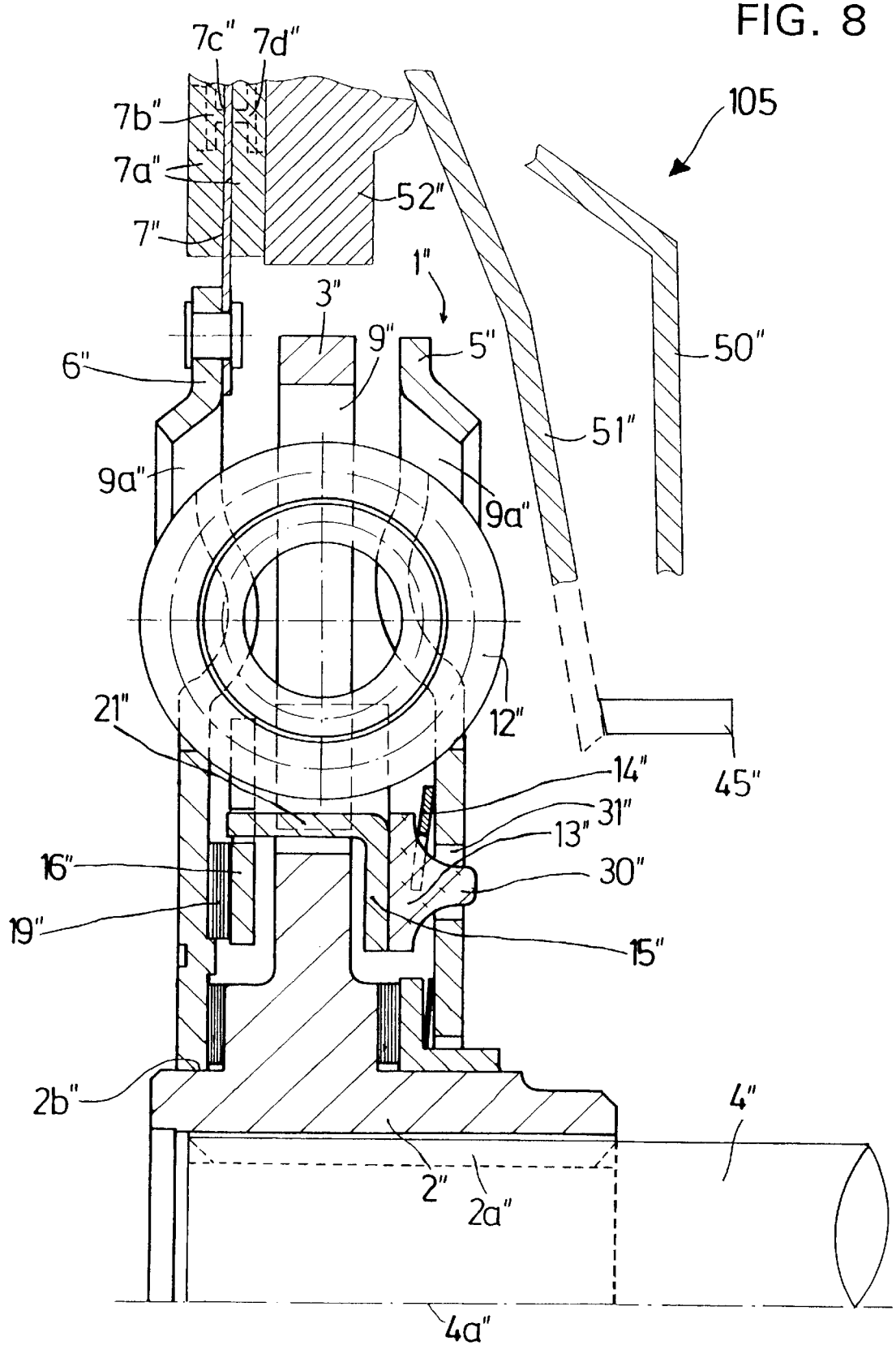
FIG. 8 shows a sectional view of a friction clutch.

As shown in FIG. 8, a friction clutch 105 can generally have a clutch disc 1", which clutch disc 1" can have a hub 2" that can be configured to be mounted non-rotationally on a transmission shaft 4". Such a mounting can be provided, for example, by means of a toothing 2a" disposed within the hub 2", which toothing 2a" would preferably be configured to correspond to similar toothing on the transmission shaft 4". In general, the transmission shaft 4" defines an axis of rotation 4a", about which the hub 2" rotates.

As is also shown in partial section in FIG. 8, the friction clutch 105 could also preferably have a housing 50" for housing the components of the clutch therein. Within the friction clutch 105, the hub 2" of the clutch plate 1" can preferably be provided with a hub disc 3", which hub disc 3" can be integral with the hub 2", and which hub disc 3" can point radially outward from the hub 2".

On both sides of the hub disc 3", cover plates 5" and 6" can preferably be provided, which cover plates 5" and 6" can be fixed in relation to one another, and held at an axial distance in relation to one another. At least one of the two cover plates, for example, the cover plate 6", as shown in FIG. 8, in its radially outer region, can preferably have a lining support 7", to which friction linings 7a" can be fastened. The two cover plates 5" and 6", for example, can preferably be guided in the radial direction, by means of a bore in one of the two cover plates 5", 6", on a cylindrical guide surface 2b" of the hub 2", as also shown in FIG. 8.

As shown in FIG. 8, the friction rings 7a" can preferably be connected to one another and to the lining support 7" by means of a fastening rivet 7b", which fastening rivet 7b" preferably runs through a passage 7c". The rivets 7b" can preferably form a non-detachable connection to the corresponding lining supports 7" by means of a rivet head 7d", which holds the rivet 7b" in place. The rivet 7b", rivet head 7d" and passage 7c" are further illustrated in FIG. 9.

Within the housing 50" there can also preferably be a pressure plate device 52" for applying an axial force to the friction linings 7a" to engage the linings 7a" with a counterthrust plate (not shown here, but see 1 in FIGS. 1 and 1a) which would essentially be rotating with the engine, to thereby cause the hub disc 3" to also rotate with the engine and turn the shaft 4". The pressure source for applying this axial pressure to the pressure plate device 52" could preferably be a biasing member, such as a spring device 51", which can bias the pressure plate 52" away from the housing 50" into engagement with the friction linings 7a". In addition, as shown schematically in FIG. 8, a pressure release device 45" can be provided for relieving the pressure of the pressure plate 52" on the friction linings 7a". Such a device 45" can in essence work against the biasing force of spring device 51". Such arrangements of pressure plate device 52", biasing members 51", pressure relief device 45" and housing 50" are generally well known, and are therefore shown only schematically in the figures.

In the hub disc 3" there will typically be windows 9" in which windows, coil springs 12" will generally be disposed. These coil springs 12" can essentially be disposed about the hub disc 3" over the same average diameter from the axis of rotation 4a", and can also essentially be uniformly placed about the circumference. Similar windows 9a" will typically be located in the cover plates 5" and 6" also for receiving the springs 12" therein.

As shown in FIG. 8, additional components can preferably be provided radially inside the coil springs 12" and between the cover plates 5" or 6" and the hub disc 3". On the one side there can preferably be a friction ring 13" with lugs 30" that can be guided in openings 31" of the cover plate 5", a spring 14", and a control plate 15". On the opposite side there can be a thrust ring 16" and a friction ring 19". The control plate 15" and thrust ring 16" can preferably be held non-rotationally to one another and at an axial distance from one another, by means of axially-bent tabs 21", which can be provided on either, or both parts.

Figure 5:
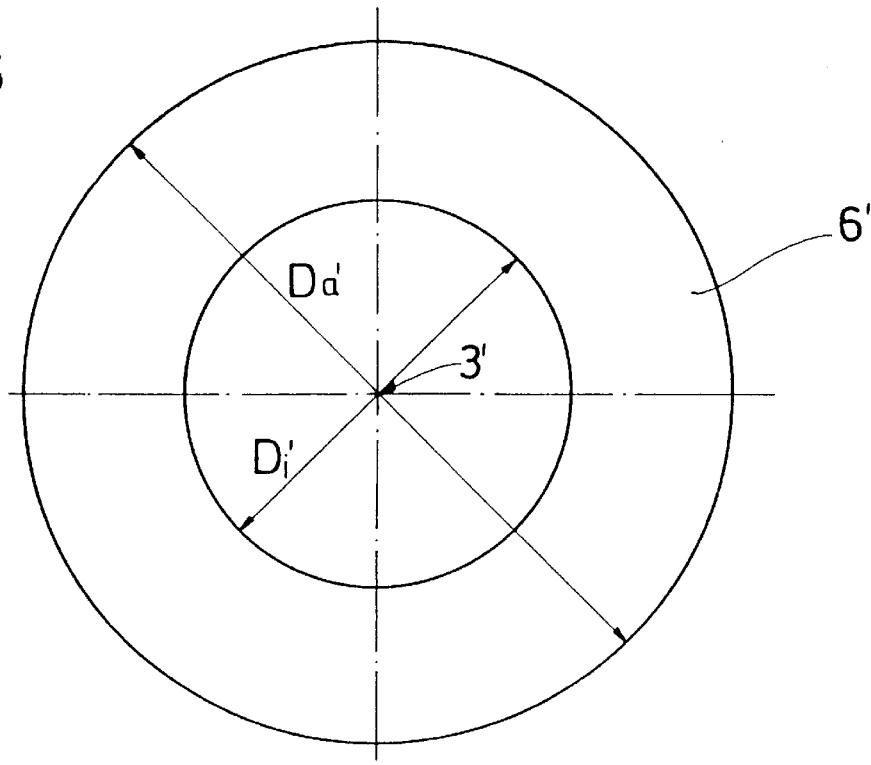
FIG. 5 shows a plan view of a friction ring or friction lining.
Figure 6:
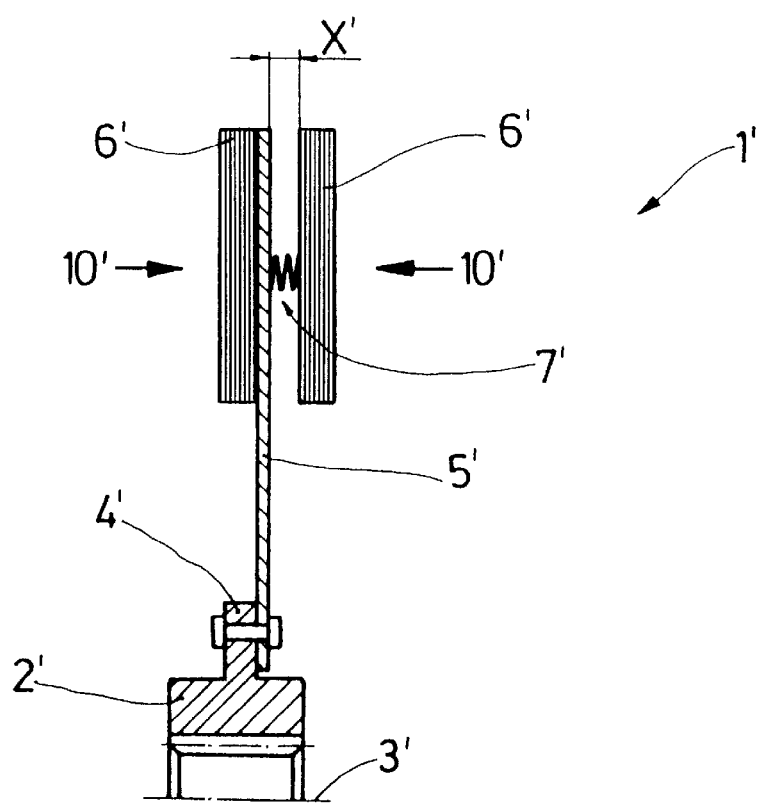
FIG. 6 shows a section through the upper half of a clutch plate with the use of friction rings as illustrated in FIG. 5.
Figure 9:
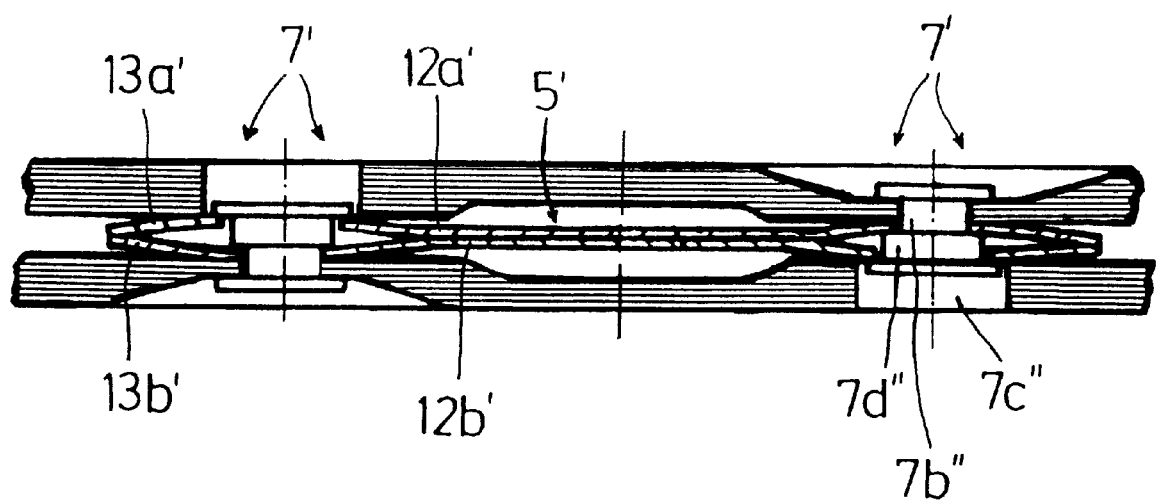
FIG. 9 shows one possible embodiment of a spring device disposed between adjacent friction rings.

It should generally be understood that the embodiments of the friction rings and lining supports as presented herebelow with reference to FIGS. 5, 6 and 9, can preferably be interchangeable with the embodiment of the friction clutch as presented hereabove with reference to FIG. 8. Referring now to the simplified depiction of a clutch disc as shown in FIG. 6, a clutch plate 1' can typically be oriented concentric to an axis of rotation 3'. The clutch plate 1' can essentially comprise a hub 2' which can be installed non-rotationally on a transmission shaft (not shown in FIG. 6). Located on the hub 2', there can preferably be a hub disc 4', to which hub disc 4' there can preferably be fastened a support 5' which can extend radially outwardly from the hub 2'. There can also be a torsional vibration damper (not shown in FIG. 6, but essentially represented by the coil springs 12" as shown in FIG. 8) on the support 5' or between the support 5' and the hub disc 4'.

In the radially outer area of the support 5', there can preferably be at least one friction ring 6', and preferably two friction rings 6' fastened one on each side, whereby there can preferably be a spring device 7' between the two friction rings 6'. One type of such spring device 7' can possibly be provided as depicted in FIG. 9, wherein the lining support 5' can preferably be formed by a pair of corrugated metal plates 12a', 12b', with the corrugations 13a', 13b', being of a size sufficient to act as biasing members. Such a spring device 7', for example, can be active both between two friction rings 6' and also between one friction ring 6' and the support 5'.

As shown in FIG. 5, a friction ring 6' can preferably have an inside diameter ($D_i'$) and an outside diameter ($D_a'$), wherein one can determine a ratio of the outside diameter ($D_a'$) to the inside diameter ($D_i'$). It has surprisingly been found that this ratio should preferably be less than or equal to about 1.4. More particularly, this ratio can preferably be between about 1.25 and about 1.38, while, in at least one configuration of the present invention, the ratio can essentially be in the range of approximately 1.3. In this range for the diameter ratio, the clutch plate 1' can absorb a maximum amount of heat generated by friction, as is generated, for example, when the vehicle is repeatedly required to start on an uphill slope.

The absorption of the heat generated by friction can be increased further by providing the spring device 7' which, when the clutch is fully engaged and there is a corresponding load on the friction rings 6' from the pressure plate and the counterpressure plate of the friction clutch, as shown by the arrows 10' in FIG. 6, has a remaining spring travel (X'). This remaining spring travel (X') can advantageously be in the range from about 0.10 mm to about 0.30 mm. (Shown exaggerated in FIG. 6 for purposes of illustration only.)

Clutch discs, can, for example, have an outer diameter in the range of between about 22.50 cm and about 22.70 cm. For example, a clutch disc manufactured by Sachs, West Germany, and having part No. 18-1861 969 301, has friction linings with an outside diameter of about 22.70 cm and an inside diameter of about 15.00 cm, while a clutch disc manufactured by Ford Motor Company and having part No. E57A7550GA, has friction linings with an outside diameter of about 22.50 cm and an inside diameter of about 14.90 cm. As such, both of these two known clutch discs have friction linings with diameter ratios of about 1.51.

In the context of the size of such known friction linings, a friction lining in accordance with the present invention, and having a diameter ratio of about 1.3, could have an outside diameter of between about 21 cm to about 24 cm. Even more specifically the outer diameter could be between about 22.50 cm and 22.70 cm with a corresponding inside diameter in the range of between about 17.30 and 17.45. Alternatively, other sizes of friction linings having a diameter ratio as defined by the present invention would be possible, and variations on the available sizes would be well within the skill of the artisan. For example, for large motor vehicles, such as trucks, etc, the friction linings may be of a size of up to about 30 cm, or even greater, and for small vehicles, the size might be as small as possible 15 cm, or less. As such, the external diameter could possibly have a value of 15 cm, 16 cm, 17 cm, 18 cm, 19 cm, 20 cm, 21 cm, 22 cm, 23 cm, 24 cm, 25 cm, 26 cm, 27 cm, 28 cm, 29 cm and 30 cm.

Within the context of the present invention, one could maintain the diameter ratio in a number of ways. For instance, if it was desirable to maintain the outside diameter of a friction lining the same size as commonly used in the past, the inside diameter could be enlarged to provide the ratio in accordance with the present invention. Further, if it was desirable to reduce the overall diameter of the friction linings while maintaining the same inside diameter, only the outside dimension of the friction linings would need to be reduced. Alternatively, it might be desirable that a friction lining in accordance with the present invention has the same surface area as has commonly been used in the past. As such, both the inside and outside diameters would essentially need to be enlarged to a degree at which such a ratio, in accordance with the present invention was attainable, while preserving the surface area.

One further aspect of the present invention resides broadly in the manufacture and use of a clutch disc having the diameter ratio in accordance with the present invention in a transmission of a motor vehicle, or even more particularly to the use of such a clutch disc in a large number of mass produced motor vehicles, wherein the clutch disc itself, is also mass produced. The concept of mass production in essence, can possibly refer to the production of at least hundreds of units per day, and can possibly range up to the production of thousands of units per day. As such, a large number of such friction rings can be mass produced, the friction rings can then preferably be assembled in mass production with additional components, such as the hub and lining supports, to form friction discs. The mass produced friction discs can then be further assembled in mass production with additional components to form a friction clutch assembly. The friction clutch assemblies can then be installed in the transmission of motor vehicles during the mass production of the motor vehicles.

During operation of a motor vehicle equipped with friction discs, peak loads on the friction linings can then be significantly reduced. In operation of a motor vehicle, during a starting operation, the clutch of the motor vehicle is disengaged. Once the engine is running, and to begin movement, the clutch is re-engaged so that the friction linings can come into contact with the engine flywheel, during initial contact, the friction linings will slip with respect to the flywheel, thereby generating heat from the friction of the slippage. Then, the friction discs will engage with the engine flywheel, and rotate therewith to rotate the transmission of the motor vehicle.

During repeated startings and stoppings of the motor vehicle, there will be an increased number of periods of time when the slippage is occurring between the engine flywheel and the friction discs. During such frequently repeated instances of slippage, heat dissipation may not be able to occur quickly enough and heat can build up in the friction discs, and warpage can occur. Once warpage occurs, portions of the discs may no longer contact the engine flywheel, and the transmission capability of the clutch is typically reduced. Such warpage can also worsen the distribution of heat, as only the portions of the discs in contact with the flywheel will be heated, and these portion will typically be heated to a greater degree, thereby making the possibility of even greater warpage likely.

Instances as outlined above, wherein a motor vehicle is repeatedly needing to be stopped and then moved again, such as in heavy "stop and go" traffic, can be even more pronounced if the motor vehicle is travelling up a hillside, as a greater amount of slippage of the clutch discs would typically occur before engagement. Thus, heating can be even more pronounced. Also, the load of the motor vehicle, that is, the number of passengers, the cargo, or if the motor vehicle is hauling a trailer, or boat, etc., can also adversely affect the heating of the friction discs. In this regard, the greater the load, the greater the amount of slippage that would occur prior to engagement, the greater the amount of heat that would be generated, and the more pronounced the warpage and uneven heat distribution would become.

By providing a motor vehicle transmission with clutch discs in accordance with the present invention, the clutch discs will typically be able to withstand a greater amount of heating before warpage might occur. Thus, a greater surface area of the discs in accordance with the present invention will be available for contact with the engine flywheel, thereby providing an increased transmission capability, and enabling heat distribution to remain more uniform for longer periods of time, thus reducing peak loads on the friction linings.

One feature of the invention resides broadly in the friction clutch with a flywheel and a clutch housing which are connected to one another by means of a preferably cylindrical wall in the radially outer portion of the clutch housing running in a ring-shaped manner around the axis of rotation of the flywheel, which clutch housing encloses a clutch plate with friction linings in the radially outer area, and with an application plate or pressure plate which can be pressed toward the clutch plate by means of an application spring, characterized by the fact that the friction linings 28 are guided radially outward up to directly next to the cylindrical wall 5, to make possible, with a specified friction surface, a minimum ratio of outside diameter to inside diameter on the friction linings 28, which are connected to the clutch disc 10 without the interposition of a lining spring system.

Another feature of the invention resides broadly in the friction clutch characterized by the fact that the ratio of the outside diameter to the inside diameter of the friction lining 28 is less than 1.4.

Yet another feature of the invention resides broadly in the friction clutch characterized by the fact that the friction lining 28 is connected to the clutch plate 10 by means of gluing or spraying on.

Still another feature of the invention resides broadly in the friction clutch characterized by the fact that the clutch housing 7 has at least one area 51 which is elastically deformable in the excursion direction of the application plate 12.

A further feature of the invention resides broadly in the friction clutch characterized by the fact that the wall thickness 50 of the clutch housing 7 is reduced at least in the area 51 provided for the elastic deformation.

Another feature of the invention resides broadly in the friction clutch characterized by the fact that the clutch housing 7 is connected by means of at least one spring element 30 to the application plate 12, and is engaged on the latter inside the span or extension of the friction lining 28 on its side farther from the friction lining 28.

Yet another feature of the invention resides broadly in the friction clutch characterized by the fact that the spring element 30 is held to the application plate 12 by means of a fastening means 31 which is located in an opening 32 formed in the application plate 12 in the span of the friction lining 28.

Still another feature of the invention resides broadly in the friction clutch characterized by the fact that the application spring 15 is fastened radially inside the span of the friction lining 28 to the clutch housing 7, and applies pressure to the application plate 12.

A further feature of the invention resides broadly in the friction clutch characterized by the fact that the application plate 12 is designed in a ring shape, and the outside diameter of the application spring 15 runs in the radially inside area of the application plate 12.

Another feature of the invention resides broadly in the friction clutch characterized by the fact that the application spring 15 is fastened to the clutch housing 7 radially inside the application plate 12.

Yet another feature of the invention resides broadly in the friction clutch characterized by the fact that while reducing the weight of the other clutch components, such as the flywheel 1 or the application spring 15, the application plate 12 can be made heavier by the corresponding amount to stabilize it against thermal distortion or warping.

Still another feature of the invention resides broadly in the friction clutch with a flywheel and a clutch housing which are connected to one another by means of a preferably cylindrical wall in the radially outer portion of the clutch housing running in a ring-shaped manner around the axis of rotation of the flywheel, which clutch housing encloses a clutch plate with friction linings in the radially outer area, and with an application plate which can be pressed toward the clutch plate by means of an application spring, characterized by the fact that the friction linings 28 are guided radially outward up to directly next to the cylindrical wall 5, to make possible, with a specified friction surface, a minimum ratio of outside diameter to inside diameter on the friction linings 28, which are connected to the clutch disc 10, whereby the deformation of the lining spring system 55 in the axial direction is essential limited to a dimension which is necessary to compensate for a thermally-caused distortion of one of the clutch elements flywheel 1, application plate 12 which can be brought into engagement with the respective friction lining 28.

A further feature of the invention resides broadly in the friction clutch characterized by the fact that the deformation distance of the lining spring system 55 in the axial direction is specified in a range between 0.1 and 0.3 mm.

Some examples of adhesives which could be used in accordance with the present invention may be disclosed by the following U.S. Pat. Nos. 5,355,986 to Biswas, entitled "Clutch and Disc Brake Assembly"; U.S. Pat. No. 5,199,540 to Fitzpatrick-Ellis et al., entitled "Friction Facing Material and Carrier Assembly"; U.S. Pat. No. 5,176,852 to Kondo et. al, entitled "Adhesive Compositions"; U.S. Pat. No. 5,180,784 to Ohmae et al., entitled "Adhesive Resin Composition"; U.S. Pat. No. 5,177,133 to Peck et al., entitled "Hot Melt Adhesive Composition"; U.S. Pat. No. 5,180,627 to Inoue et al., entitled "Heat Resistant Adhesive Composition"; and U.S. Pat. No. 4,700,823 to Winckler, entitled "Clutch With Pyrolytic Carbon Friction Material".

Possible methods of applying the friction linings of the present invention to the clutch plate may be disclosed in the following U.S. Pat. No. 4,770,283 to Putz et al., entitled "Friction Ring for Clutches or Brakes, and a Method and Device for Producing the Friction Ring"; and U.S. Pat. No. 4,420,441 to Singer, entitled "Method of Making a Two-phase or Multi-phase Metallic Material".

Some examples of clutch discs and friction linings, which could have components interchangeable with the embodiments of the present invention may be disclosed by the following U.S. Pat. No. 5,000,304 to Koch, Raab, Dotter and Ament, entitled "Clutch Disc"; U.S. Pat. No. 4,941,558 to Schraut, entitled "Clutch Disc"; U.S. Pat. No. 4,854,438 to Weissenberger and Huditz, entitled "Clutch Disc for a Friction Disc Clutch"; U.S. Pat. No. 4,741,423 to Hayen, entitled "Clutch Disc for a Friction Clutch"; and U.S. Pat. No. 4,715,485 to Rostin, Tomm and Hartig, entitled "Clutch Disc for a Motor Vehicle Friction Clutch".

Some examples of transmissions in which the present invention may possibly be incorporated may be disclosed by the following U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application Nos. P 44 24 478.9, filed on Sep. 12, 1994 and P 195 13 454.0, filed on Apr. 8, 1995, having inventor Heiko Schulz-Andres, and DE-OS P 44 24 478.9 and P 195 13 454.0 and DE-PS P 44 24 478.9 and P 195 13 454.0 are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch, for a motor vehicle, said friction clutch comprising:

a flywheel, said flywheel having an axis of rotation and defining an axial direction parallel to the axis of rotation;

a housing;

a clutch plate disposed within said housing, said clutch plate having an outer circumference disposed about the axis of rotation and an inner circumference disposed within said outer circumference;

a pressure plate disposed within said housing for engaging and disengaging said clutch plate with said flywheel;

said clutch plate being disposed between said flywheel and said pressure plate;

means for biasing said pressure plate towards said flywheel; said clutch plate comprising:

a hub for being non-rotationally connected to a transmission shaft, said hub being disposed at said inner circumference of said clutch plate;

at least one friction lining being disposed for contacting said flywheel and being disposed for contacting said pressure plate upon engagement of said clutch plate, said at least one friction lining having an inner diameter and an outer diameter;

said at least one friction lining having a predetermined surface area defined between said inner diameter and said outer diameter of said at least one friction lining;

said at least one friction lining being disposed at said outer circumference of said clutch plate;

means for enclosing at least said clutch plate, said enclosing means comprising wall means;

said wall means having an interior portion facing towards said clutch plate and an exterior portion opposite said interior portion, said interior portion of said wall means having a diameter;

said at least one friction lining being disposed to form a clearance between said interior portion of said wall means and said outer diameter of said at least one friction lining, said clearance being minimized but permitting substantially unencumbered rotation of said clutch plate during operation of said friction clutch;

said outer diameter of said at least one friction lining being maximized with respect to said diameter of said interior portion of said wall means, and said inner diameter of said at least one friction lining being maximized to maintain said predetermined surface area of said at least one friction lining;

said housing comprising an elastic portion and a portion adjacent to said elastic portion;

said elastic portion being substantially more elastic than said adjacent housing portion; and said elastic portion having sufficient elasticity to reduce the force required to activate the clutch.

2. The friction clutch according to claim 1 wherein said at least one friction lining is directly and rigidly fastened to said clutch plate.

3. The friction clutch according to claim 2 wherein the ratio of said outer diameter of said at least one friction lining to said inner diameter of said at least one friction lining is less than 1.4.

4. The friction clutch according to claim 3 wherein:

said housing has an outer circumference disposed about the axis of rotation and an inner circumference disposed within said outer circumference;

said elastic portion is disposed adjacent said inner circumference of said housing; and said elastic portion has a thickness dimension sufficient for permitting elastic deformation of said portion, said portion being elastically deformable in the axial direction.

5. The friction clutch according to claim 4 wherein said at least one friction lining has been fastened to said clutch plate by one of a) and b):
   a) adhesive; and
   b) spraying said at least one friction lining onto said clutch plate.

6. The friction clutch according to claim 5 wherein:
   one of said flywheel and said housing comprises said wall means;
   said wall means extends substantially axially from said one of said flywheel and said housing towards the other one of said flywheel and said housing; and
   said wall means comprises means for connecting said flywheel and said housing to one another in a non-rotatable manner.

7. The friction clutch according to claim 6 wherein:
   said pressure plate has a first side facing said at least one friction lining and a second side facing away from said at least one friction lining;
   said friction clutch further comprises means for fastening said pressure plate to said housing, said fastening means being disposed at said second side of said pressure plate and within said outer diameter of said at least one friction lining;
   said pressure plate further comprises an outer circumference disposed about the axis of rotation and an inner circumference disposed within said outer circumference;
   said biasing means comprises an application spring having an inner circumference and an outer circumference, said outer circumference of said application spring contacting said inner circumference of said pressure plate to bias said pressure plate towards said flywheel;
   said housing comprises means for positioning said application spring with respect to said housing, said positioning means being disposed adjacent said inner circumference of said housing and adjacent said outer circumference of said application spring; and
   said positioning means being disposed radially inward of said contacting of said inner circumference of said pressure plate and said outer circumference of said application spring.

8. The friction clutch according to claim 7 wherein:
   said ratio of said outer diameter of said at least one friction lining to said inner diameter of said at least one friction lining is between 1 and 1.4;
   said inner circumference of said pressure plate comprises an extension, said extension extending axially from said pressure plate towards said application spring, said extension contacting said outer circumference of said application spring;
   said fastening means comprises:
      a plurality of spring elements in the form of leaf springs;
      a plurality of rivets;
   said pressure plate further comprises a plurality of openings extending between said first side of said pressure plate and said second side of said pressure plate;
   each of said plurality of rivets is disposed in a corresponding one of said plurality of openings of said pressure plate, to fasten a corresponding one of said plurality of spring elements to said pressure plate;
   each of said plurality of openings is disposed within said outer diameter of said at least one friction lining;
   said pressure plate comprises a ring-like shape;
   said at least one friction lining comprises two friction linings, said two friction linings being a first friction lining and a second friction lining;
   said clutch plate further comprises:
      a lining support disposed adjacent said outer circumference of said clutch plate, said lining support having a first side and a second side disposed opposite one another;
      said first friction lining is directly and rigidly attached to said first side of said lining support and said second friction lining is directly and rigidly attached to said second side of said lining support;
      a hub disc disposed substantially perpendicular with respect to said hub, said hub disc having a first side and a second side disposed opposite one another;
      a first cover plate disposed on said first side of said hub disc and a second cover plate disposed on said second side of said hub disc, said first cover plate comprising said lining support; and
      vibration damping means disposed between said first and second cover plates;
   said flywheel comprises:
      an outer circumference disposed about the axis of rotation and an inner circumference disposed within said outer circumference;
      said wall means, said wall means comprising a ring-like shape extending about said outer circumference of said
   flywheel; and
   said positioning means comprises at least one clip, said at least one clip being substantially integral with said housing.

9. The friction clutch according to claim 3 wherein:
   said housing further comprises:
      an outer circumference disposed about the axis of rotation and an inner circumference disposed within said outer circumference;
      said wall means, said wall means extending substantially axially from said outer circumference of said housing towards said flywheel;
      said wall means comprises means for connecting said flywheel and said housing to one another in a non-rotatable manner;
   the ratio of said outer diameter of said at least one friction lining to said inner diameter of said at least one friction lining is less than 1.4;
   said pressure plate has a first side facing said at least one friction lining and a second side facing away from said at least one friction lining;
   said friction clutch further comprises means for fastening said pressure plate to said housing, said fastening means being disposed at said second side of said pressure plate and within said outer diameter of said at least one friction lining;
   said pressure plate comprises an outer circumference disposed about the axis of rotation and an inner circumference disposed within said outer circumference;
   said biasing means comprises an application spring having an inner circumference and an outer circumference, said outer circumference of said application spring contacting said inner circumference of said pressure plate to bias said pressure plate towards said flywheel;
   said housing comprises means for positioning said application spring with respect to said housing, said positioning means being disposed adjacent said inner circumference of said housing and adjacent said outer circumference of said application spring;

said positioning means being disposed radially inward of said contacting of said inner circumference of said pressure plate and said outer circumference of said application spring;

said fastening means comprises:
  a plurality of spring elements in the form of leaf springs;
  a plurality of rivets;

said pressure plate further comprises a plurality of openings disposed between said first side of said pressure plate and said second side of said pressure plate;

each of said plurality of rivets is disposed in a corresponding one of said plurality of openings of said pressure plate, to fasten a corresponding one of said plurality of spring elements to said pressure plate;

each of said plurality of openings each is disposed within said outer diameter of said at least one friction lining;

said pressure plate comprises a ring-like shape;

said at least one friction lining comprises two friction linings, said two friction linings being a first friction lining and a second friction lining;

said clutch plate further comprises:
  a lining support disposed adjacent said outer circumference of said clutch plate, said lining support having a first side and a second side disposed opposite one another;
  said first friction lining is directly and rigidly attached to said first side of said lining support and said second friction lining is directly and rigidly attached to said second side of said lining support;
  a hub disc disposed substantially perpendicular with respect to said hub, said hub disc having a first side and a second side disposed opposite one another;
  a first cover plate disposed on said first side of said hub disc and a second cover plate disposed on said second side of said hub disc, said first cover plate comprising said lining support; and
  vibration damping means disposed between said first and second cover plates and said hub disc;

said wall means comprises a ring-shape extending about said outer circumference of said housing;

said positioning means comprises at least one rivet;

said application spring comprises means for receiving said at least one rivet; and said housing comprises means for receiving said at least one rivet, said at least one rivet being disposed in said receiving means of said application spring and said receiving means in said housing.

10. A method of making and operating a friction clutch for a motor vehicle, said friction clutch comprising: a flywheel, said flywheel having an axis of rotation and defining an axial direction parallel to the axis of rotation; a housing; a clutch plate disposed within said housing, said clutch plate having an outer circumference disposed about the axis of rotation and an inner circumference disposed within said outer circumference; a pressure plate disposed within said housing for engaging and disengaging said clutch plate with said flywheel; said clutch plate being disposed between said flywheel and said pressure plate; means for biasing said pressure plate towards said flywheel; said clutch plate comprising: a hub for being non-rotationally connected to a transmission shaft, said hub being disposed at said inner circumference of said clutch plate; at least one friction lining being disposed for contacting said flywheel and being disposed for contacting said pressure plate upon engagement of said clutch plate, said at least one friction lining having an inner diameter and an outer diameter; said at least one friction lining having a predetermined surface area defined between said inner diameter and said outer diameter of said at least one friction lining; said at least one friction lining being disposed at said outer circumference of said clutch plate; means for enclosing at least said clutch plate, said enclosing means comprising wall means; said wall means having an interior portion facing towards said clutch plate and an exterior portion opposite said interior portion, said interior portion of said wall means having a diameter; said at least one friction lining being disposed to form a clearance between said interior portion of said wall means and said outer diameter of said at least one friction lining, said clearance being minimized but permitting substantially unencumbered rotation of said clutch plate during operation of said friction clutch; and said outer diameter of said at least one friction lining being maximized with respect to said diameter of said interior portion of said wall means, and said inner diameter of said at least one friction lining being maximized to maintain said predetermined surface area of said at least one friction lining, said method comprising the steps of:

providing a flywheel, said flywheel having an axis of rotation and defining an axial direction parallel to the axis of rotation;

providing a housing;

providing a clutch plate, said clutch plate having an outer circumference disposed about the axis of rotation and an inner circumference disposed within said outer circumference;

providing a pressure plate for engaging and disengaging said clutch plate with said flywheel;

providing means for biasing said pressure plate towards said flywheel;

said step of providing said clutch plate further comprising:
  providing a hub for being non-rotationally connected to a transmission shaft;
  providing at least one friction lining for contacting said flywheel and for contacting said pressure plate upon engagement of said clutch plate, said at least one friction lining having an inner diameter and an outer diameter;
  providing said at least one friction lining with a predetermined surface area defined between said inner diameter and said outer diameter of said at least one friction lining; providing means for enclosing at least said clutch plate;

said step of providing said enclosing means further comprises providing wall means;

said step of providing said wall means further comprises providing said wall means with an interior portion facing towards said clutch plate and an exterior portion opposite said interior portion, said interior portion of said wall means having a diameter;

said method further comprising the steps of:
  disposing said at least one friction lining for contacting said flywheel and for contacting said pressure plate upon engagement of said clutch plate;
  further disposing said at least one friction lining at said outer circumference of said clutch plate;
  disposing said hub at said inner circumference of said clutch plate;

non-rotationally connecting said hub to a transmission shaft;

disposing said clutch plate within said housing;

disposing said pressure plate within said housing;

further disposing said clutch plate between said flywheel and said pressure plate;

enclosing at least said clutch plate with said enclosing means;

biasing said pressure plate towards said flywheel, with said biasing means;

engaging said clutch plate with said flywheel, by means of said pressure plate, to make contact between said at least one friction lining, said flywheel and said pressure plate;

disengaging said clutch plate with said flywheel, by releasing said pressure plate, and discontinuing contact between said at least one friction lining, said flywheel and said pressure plate;

further disposing said at least one friction lining to form a clearance between said interior portion of said wall means and said outer diameter of said at least one friction lining;

minimizing said clearance while permitting substantially unencumbered rotation of said clutch plate during operation of said friction clutch;

maximizing said outer diameter of said at least one friction lining with respect to said diameter of said interior portion of said wall means, and maximizing said inner diameter of said at least one friction lining to maintain said predetermined surface area of said at least one friction lining;

configuring said housing to comprise an elastic portion and a portion adjacent to said elastic portion;

configuring said elastic portion to be substantially more elastic than said adjacent housing portion; and providing sufficient elasticity by said elastic portion to reduce the force required to activate the clutch.

11. The method according to claim 10 further comprising fastening said at least one friction lining directly and rigidly to said clutch plate.

12. The method according to claim 11 further comprising fastening said at least one friction lining to said clutch plate by one of a) and b):

a) adhesive; and b) spraying said at least one friction lining onto said clutch plate.

13. The method according to claim 12 further comprising:

configuring said housing to comprise:

an outer circumference disposed about the axis of rotation and an inner circumference disposed within said outer circumference; and said elastic portion disposed adjacent said inner circumference of said housing;

configuring said elastic portion to have a thickness dimension sufficient for permitting elastic deformation of said portion;

elastically deforming said portion in the axial direction;

configuring said clutch plate to further comprise a ratio of said outer diameter of said.at least one friction lining to said inner diameter of said at least one friction lining, said ratio being less than 1.4;

configuring one of said flywheel and said housing to comprise said wall means;

extending said wall means substantially axially from said one of said flywheel and said housing towards the other one of said flywheel and said housing;

configuring said wall means to comprise means for connecting said flywheel and said housing to one another in a non-rotatable manner;

connecting said flywheel and said housing to one another in a non-rotatable manner, with said connecting means;

configuring said pressure plate to have a first side facing said at least one friction lining and a second side facing away from said at least one friction lining;

said steps of minimizing said clearance and maximizing said outer diameter of said at least one friction lining further comprise reducing the force required to disengage said clutch plate;

reducing the weight of at least one of: said flywheel and said application spring by a predetermined amount, and increasing the weight of said pressure plate by said predetermined amount, to stabilize said pressure plate against at least one of: thermal distortion and warping;

providing means for fastening said pressure plate to said housing;

disposing said fastening means at said second side of said pressure plate and within said outer diameter of said at least one friction lining;

configuring said pressure plate to further comprise an outer circumference disposed about the axis of rotation and an inner circumference disposed within said outer circumference;

said step of providing said biasing means further comprises providing an application spring having an inner circumference and an outer circumference;

contacting said inner circumference of said pressure plate with said outer circumference of said application spring and biasing said pressure plate towards said flywheel;

said step of providing said housing further comprises providing means for positioning said application spring with respect to said housing;

disposing said positioning means adjacent said inner circumference of said housing and adjacent said outer circumference of said application spring;

positioning, with said positioning means, said application spring with respect to said housing;

further disposing said positioning means radially inward of said contacting of said inner circumference of said pressure plate and said outer circumference of said application spring;

configuring said inner circumference of said pressure plate to comprise an extension;

extending said extension axially from said pressure plate towards said application spring to contact said outer circumference of said application spring;

configuring said fastening means to comprise:

a plurality of spring elements in the form of leaf springs;

a plurality of rivets;

configuring said pressure plate to further comprise a plurality of openings;

extending said plurality of openings between said first side of said pressure plate and said second side of said pressure plate;

disposing each of said plurality of rivets in a corresponding one of said plurality of openings of said pressure plate, and fastening a corresponding one of said plurality of spring elements to said pressure plate;

disposing each of said plurality of openings within said outer diameter of said at least one friction lining;

configuring said pressure plate to comprise a ring-shape;

configuring said at least one friction lining to comprise two friction linings, said two friction linings being a first friction lining and a second friction lining;

configuring said clutch plate to further comprise:
a lining support;
disposing said lining support adjacent said outer circumference of said clutch plate, said lining support having a first side and a second side disposed opposite one another;

directly and rigidly fastening said first friction lining to said first side of said lining support and directly and rigidly attaching said second friction lining to said second side of said lining support;

further configuring said clutch plate to comprise:
a hub disc;
a first cover plate and a second cover plate; and
vibration damping means;

disposing said hub disc substantially perpendicular with respect to said hub, said hub disc having a first side and a second side disposed opposite one another;

disposing said first cover plate on said first side of said hub disc and disposing said second cover plate on said second side of said hub disc;

configuring said first cover plate to comprise said lining support;

disposing said vibration damping means between said first and second cover plates;

configuring said wall means to comprise a ring-like shape extending about said outer circumference of one of said flywheel and said housing; and configuring said positioning means to comprise at least one clip, said at least one clip being substantially integral with said housing.

14. A friction clutch, for a motor vehicle, said friction clutch comprising;
a flywheel, said flywheel having an axis of rotation and defining an axial direction parallel to the axis of rotation;
a housing;
a clutch plate disposed within said housing, said clutch plate having an outer circumference disposed about the axis of rotation and an inner circumference disposed within said outer circumference;
a pressure plate disposed within said housing for engaging and disengaging said clutch plate with said flywheel;
first means for biasing said pressure plate towards said flywheel;
said clutch plate being disposed between said flywheel and said pressure plate;
said clutch plate comprising:
a hub for being non-rotationally connected to a transmission shaft, said hub being disposed at said inner circumference of said clutch plate;
a first friction lining and a second friction lining for contacting said flywheel and said pressure plate upon engagement of said clutch plate;
said first friction lining and said second friction lining being disposed at said outer circumference of said clutch plate;
second means for biasing said first friction lining and said second friction lining away from one another;
said second biasing means having means for permitting axial movement of said first friction lining and said second friction lining towards one another upon engagement of said first friction lining and said second friction lining between said flywheel and said pressure plate, said axial movement being of a minimum dimension sufficient to compensate for thermal distortions, at maximum operating temperatures, of at least one of: said flywheel and said pressure plate;

said housing comprising an elastic portion and a portion adjacent to said elastic portion;

said elastic portion being substantially more elastic than said adjacent housing portion; and said elastic portion having sufficient elasticity to reduce the force required to activate the clutch.

15. The friction clutch according to claim 14 wherein said axial movement is between 0.1 mm and 0.3 mm.

16. The friction clutch according to claim 15 wherein:
said friction clutch further comprises means for enclosing at least said clutch plate;
said enclosing means comprises wall means, said wall means having an interior portion and an exterior portion opposite said interior portion;
said interior portion of said wall means has a diameter;
said first friction lining and said second friction lining each have an inner diameter, an outer diameter, and a predetermined surface area defined between said inner and outer diameters;
said first and second friction linings are disposed to form a clearance between said interior portion of said wall means and said outer diameters of said first friction lining and said second friction lining, said clearance being minimized but permitting substantially unencumbered rotation of said clutch plate during operation of said friction clutch; and
said outer diameters of said first friction lining and said second friction lining are maximized with respect to said diameter of said interior portion of said wall means, and said inner diameters of said first friction lining and said second friction lining are maximized to maintain said predetermined surface areas of said first friction lining and said second friction lining.

17. The friction clutch according to claim 16 wherein:
said pressure plate has a first side facing said at least one friction lining and a second side facing away from said at least one friction lining;
said friction clutch further comprises means for fastening said pressure plate to said housing, said fastening means being disposed at said second side of said pressure plate and within said outer diameter of said at least one friction lining;
said pressure plate further comprises an outer circumference disposed about the axis of rotation and an inner circumference disposed within said outer circumference;
said first biasing means comprises an application spring having an inner circumference and an outer circumference, said outer circumference of said application spring contacting said inner circumference of said pressure plate to bias said pressure plate towards said flywheel;
said housing comprises means for positioning said application spring with respect to said housing, said positioning means being disposed adjacent said inner circumference of said housing and adjacent said outer circumference of said application spring; and
said positioning means being disposed radially inward of said contacting of said inner circumference of said pressure plate and said outer circumference of said application spring.

18. The friction clutch according to claim 12 wherein:

said means for permitting axial movement comprises a plurality of spring segments disposed between said first friction lining and said second friction lining;

said clutch plate further comprises a ratio of said outer diameters of said first friction lining and said second friction lining to said inner diameters of said first friction lining and said second friction lining, said ratio being between less than 1.4;

said housing further comprises:
an outer circumference disposed about the axis of rotation and an inner circumference disposed within said outer circumference;
said wall means, said wall means extending substantially axially from said outer circumference of said housing towards said flywheel;
said wall means comprises means for connecting said flywheel and said housing to one another in a non-rotatable manner;

said pressure plate has a first side facing said at least one friction lining and a second side facing away from said at least one friction lining;

said friction clutch further comprises means for fastening said pressure plate to said housing, said fastening means being disposed at said second side of said pressure plate and within said outer diameter of said at least one friction lining;

said pressure plate comprises an outer circumference disposed about the axis of rotation and an inner circumference disposed within said outer circumference;

said biasing means is a first biasing means;

said friction clutch further comprises second means for biasing said pressure plate towards said flywheel;

said second biasing means comprises an application spring having an inner circumference and an outer circumference, said outer circumference of said application spring contacting said inner circumference of said pressure plate to bias said pressure plate towards said flywheel;

said housing comprises means for positioning said application spring with respect to said housing, said positioning means being disposed adjacent said inner circumference of said housing and adjacent said outer circumference of said application spring;

said positioning means being disposed radially inward of said contacting of said inner circumference of said pressure plate and said outer circumference of said application spring;

said fastening means comprises:
a plurality of spring elements in the form of leaf springs;
a plurality of rivets;

said pressure plate further comprises a plurality of openings disposed between said first side of said pressure plate and said second side of said pressure plate;

each of said plurality of rivets is disposed in a corresponding one of said plurality of openings of said pressure plate, to fasten a corresponding one of said plurality of spring elements to said pressure plate;

each of said plurality of openings each is disposed within said outer diameter of said at least one friction lining;

said pressure plate comprises a ring-like shape;

said at least one friction lining comprises two friction linings, said two friction linings being a first friction lining and a second friction lining;

said clutch plate further comprises:
a first cover plate and a second cover plate;
a lining support disposed adjacent said outer circumference of said clutch plate, said lining support having a first side and a second side disposed opposite one another;
a hub disc disposed substantially perpendicular with respect to said hub, said hub disc having a first side and a second side disposed opposite one another;
said first cover plate is disposed on said first side of said hub disc and said second cover plate is disposed on said second side of said hub disc, said first cover plate comprising said lining support;
said means for permitting axial movement being integral with said lining support of said first cover plate;
vibration damping means disposed between said first and second cover plates and said hub disc;

said wall means comprises a ring-like shape extending about said outer circumference of said housing;

said positioning means comprises at least one rivet;

said application spring comprises means for receiving said at least one rivet; and said housing comprises means for receiving said at least one rivet, said at least one rivet being disposed in said receiving means of said application spring and said receiving means of said housing.

19. A method of making and operating a friction clutch for a motor vehicle, said friction clutch comprising: a flywheel, said flywheel having an axis of rotation and defining an axial direction parallel to the axis of rotation; a housing; a clutch plate disposed within said housing, said clutch plate having an outer circumference disposed about the axis of rotation and an inner circumference disposed within said outer circumference; a pressure plate disposed within said housing for engaging and disengaging said clutch plate with said flywheel; said clutch plate being disposed between said flywheel and said pressure plate; said clutch plate comprising: a hub for being non-rotationally connected to a transmission shaft, said hub being disposed at said inner circumference of said clutch plate; a first friction lining and a second friction lining for contacting said flywheel and said pressure plate upon engagement of said clutch plate; said first friction lining and said second friction lining being disposed at said outer circumference of said clutch plate; means for biasing said first friction lining and said second friction lining away from one another; and said biasing means having means for permitting axial movement of said first friction lining and said second friction lining towards one another upon engagement of said first friction lining and said second friction lining between said flywheel and said pressure plate, said axial movement being of a minimum dimension sufficient to compensate for thermal distortions, at maximum operating temperatures, of at least one of: said flywheel and said pressure plate, said method comprising the steps of:

providing a flywheel, said flywheel having an axis of rotation and defining an axial direction parallel to the axis of rotation;

providing a housing;

providing a clutch plate, said clutch plate having an outer circumference disposed about the axis of rotation and an inner circumference disposed within said outer circumference;

providing a pressure plate for engaging and disengaging said clutch plate with said flywheel;

providing first means for biasing said pressure plate towards said flywheel;

said step of providing said clutch plate further comprising:
  providing a hub for being non-rotationally connected to a transmission shaft;
  providing a first friction lining and a second friction lining for contacting said flywheel and said pressure plate upon engagement of said clutch plate;

providing second means for biasing said first friction lining and said second friction lining away from one another; and said step of providing said second biasing means further comprises providing means for permitting axial movement of said first friction lining and said second friction lining towards one another upon engagement of said first friction lining and said second friction lining between said flywheel and said pressure plate;

said method further comprising the steps of:
  disposing said hub at said inner circumference of said clutch plate;
  non-rotationally connecting said hub to a transmission shaft;
  disposing said first friction lining and said second friction lining at said outer circumference of said clutch plate;
  disposing said clutch plate within said housing;
  disposing said pressure plate within said housing;
  further disposing said clutch plate between said flywheel and said pressure plate;
  biasing said pressure plate towards said flywheel, with said first biasing means;
  biasing said first friction lining and said second friction lining away from one another, with said second biasing means;
  engaging said clutch plate with said flywheel, with said pressure plate, and contacting said first friction lining with said flywheel and said second friction lining with said pressure plate;
  permitting minimal axial movement, with said means for permitting axial movement, of said first friction lining and said second friction lining towards one another upon engagement of said first friction lining and said second friction lining between said flywheel and said pressure plate, to compensate for thermal distortions, at maximum operating temperatures, of at least one of: said flywheel and said pressure plate;
  configuring said housing to comprise an elastic portion and a portion adjacent to said elastic portion;
  configuring said elastic portion to be substantially more elastic than said adjacent housing portion; and
  providing sufficient elasticity by said elastic portion to reduce the force required to activate the clutch.

20. The method according to claim 19 further comprising:
permitting said axial movement of said first friction lining and said second friction lining towards one another, upon engagement of said first friction lining and said second friction lining between said flywheel and said pressure plate, between 0.1 mm and 0.3 mm;
providing means for enclosing at least said clutch plate;
enclosing at least said clutch plate with said enclosing means;
configuring said enclosing means to comprise wall means, said wall means having an interior portion and an exterior portion opposite said interior portion;
configuring said interior portion of said wall means to have a diameter;
configuring said first friction lining and said second friction lining to each have an inner diameter, an outer diameter, and a predetermined surface area defined between said inner and outer diameters;
disposing said first and second friction linings to form a clearance between said interior portion of said wall means and said outer diameters of said first friction lining and said second friction lining;
minimizing said clearance but permitting substantially unencumbered rotation of said clutch plate during operation of said friction clutch;
maximizing said outer diameters of said first friction lining and said second friction lining with respect to said diameter of said interior portion of said wall means, and maximizing said inner diameters of said first friction lining and said second friction lining to maintain said predetermined surface areas of said first friction lining and said second friction lining;
configuring said pressure plate to have a first side facing said at least one friction lining and a second side facing away from said at least one friction lining;
providing means for fastening said pressure plate to said housing;
disposing said fastening means at said second side of said pressure plate and within said outer diameter of said at least one friction lining;
configuring said pressure plate to further comprise an outer circumference disposed about the axis of rotation and an inner circumference disposed within said outer circumference;
said steps of minimizing said clearance and maximizing said outer diameters of said first and second friction linings further comprise reducing the force required to disengage said clutch plate;
said step of providing said first biasing means further comprises providing an application spring having an inner circumference and an outer circumference;
contacting said outer circumference of said application spring with said inner circumference of said pressure plate and biasing said pressure plate towards said flywheel;
configuring said housing to comprise means for positioning said application spring with respect to said housing;
disposing said positioning means adjacent said inner circumference of said housing and adjacent said outer circumference of said application spring;
positioning said application spring, with said positioning means, with respect to said housing;
further disposing said positioning means radially inward of said contacting of said inner circumference of said pressure plate and said outer circumference of said application spring;
configuring said means for permitting axial movement to comprise a plurality of spring segments;
disposing said plurality of spring elements between said first friction lining and said second friction lining;
configuring said clutch plate to further comprise a ratio of said outer diameters of said first friction lining and said second friction lining to said inner diameters of said first friction lining and said second friction lining, said ratio being less than 1.4;
configuring said housing to further comprise:

an outer circumference disposed about the axis of rotation and an inner circumference disposed within said outer circumference;

said wall means, said wall means;

extending said wall means substantially axially from said outer circumference of said housing towards said flywheel;

configuring said wall means to comprise means for connecting said flywheel and said housing to one another in a non-rotatable manner;

connecting said flywheel and said housing to one another in a non-rotatable manner, with said connecting means;

configuring said pressure plate to comprise a first side facing said at least one friction lining and a second side facing away from said at least one friction lining;

providing means for fastening said pressure plate to said housing;

disposing said fastening means at said second side of said pressure plate and within said outer diameter of said at least one friction lining;

configuring said pressure plate to comprise an outer circumference disposed about the axis of rotation and an inner circumference disposed within said outer circumference;

said biasing means is a first biasing means;

providing second means for biasing said pressure plate towards said flywheel;

configuring said second biasing means to comprise an application spring having an inner circumference and an outer circumference;

contacting said outer circumference of said application spring with said inner circumference of said pressure plate and biasing said pressure plate towards said flywheel;

configuring said housing to comprise means for positioning said application spring with respect to said housing;

disposing said positioning means adjacent said inner circumference of said housing and adjacent said outer circumference of said application spring;

further disposing said positioning means radially inward of said contacting of said inner circumference of said pressure plate and said outer circumference of said application spring;

configuring said fastening means to comprise:
 a plurality of spring elements in the form of leaf springs;
 a plurality of rivets;

configuring said pressure plate to further comprise a plurality of openings;

extending said plurality of openings between said first side of said pressure plate and said second side of said pressure plate;

disposing each of said plurality of rivets in a corresponding one of said plurality of openings of said pressure plate, and fastening a corresponding one of said plurality of spring elements to said pressure plate;

disposing each of said plurality of openings within said outer diameter of said at least one friction lining;

configuring said pressure plate to comprise a ring-like shape;

configuring said at least one friction lining to comprise two friction linings, said two friction linings being a first friction lining and a second friction lining;

configuring said clutch plate to further comprise:
 a first cover plate and a second cover plate;
 a lining support;
 a hub disc;

disposing said lining support adjacent said outer circumference of said clutch plate, said lining support having a first side and a second side disposed opposite one another;

disposing said hub disc substantially perpendicular with respect to said hub, said hub disc having a first side and a second side disposed opposite one another;

disposing said first cover plate on said first side of said hub disc and disposing said second cover plate on said second side of said hub disc;

configuring said first cover plate to comprise said lining support;

configuring said means for permitting axial movement to be integral with said lining support of said first cover plate;

configuring said clutch plate to further comprise vibration damping means;

disposing said vibration damping means between said first and second cover plates;

configuring said wall means to comprise a ring-like shape extending about said outer circumference of said housing;

configuring said positioning means to comprise at least one rivet;

configuring said application spring to comprise means for receiving said at least one rivet; and configuring said housing to comprise means for receiving said at least one rivet; and disposing said at least one rivet in said receiving means of said application spring and said receiving means of said housing.

* * * * *

UNITED STATES PATENT AND TRADEMARK OFFICE
CERTIFICATE OF CORRECTION

PATENT NO. : 5,957,258
DATED : September 28, 1999
INVENTOR(S) : Heiko SCHULZ-ANDRES and Hans Jürgen DREXL It is certified that error appears in the above-identified patent and that said Letters Patent is hereby corrected as shown below:

On the title page, item [75], after 'Drexl', delete "Schonugen," and insert --Schonungen--.

On the title page, item [56], under the FOREIGN PATENT DOCUMENTS section:

column 2, line 5, before '3/1997', delete "254692" and insert --2542692--.

column 2, line 7, before '6/1985', delete "3448027" and insert --3440827--.

On the title page, before item [57], insert the following line:

--Attorney, Agent or Firm - Nils H. Ljungman & Associates--.

UNITED STATES PATENT AND TRADEMARK OFFICE
CERTIFICATE OF CORRECTION

PATENT NO. : 5,957,258
DATED : September 28, 1999
INVENTOR(S) : Heiko SCHULZ-ANDRES et al.

It is certified that error appears in the above-identified patent and that said Letters Patent is hereby corrected as shown below:

In column 29, line 3, Claim 18, after 'claim', delete "12" and insert --17--.

Signed and Sealed this

Thirteenth Day of February, 2001

Attest:

NICHOLAS P. GODICI

Attesting Officer

Acting Director of the United States Patent and Trademark Office